US012625798B2

(12) United States Patent
Jiao et al.

(10) Patent No.: US 12,625,798 B2
(45) Date of Patent: May 12, 2026

(54) APPARATUS AND METHOD FOR ADDRESS GENERATION, DATA BUFFER, AND ARTIFICIAL INTELLIGENCE CHIP

(71) Applicant: Shenzhen Corerain Technologies Co., Ltd., Shenzhen (CN)

(72) Inventors: Li Jiao, Shenzhen (CN); Kuen Hung Tsoi, Shenzhen (CN); Xinyu Niu, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 421 days.

(21) Appl. No.: 18/184,658

(22) Filed: Mar. 16, 2023

(65) Prior Publication Data

US 2023/0325307 A1      Oct. 12, 2023

(30) Foreign Application Priority Data

Mar. 18, 2022    (CN) .......................... 202210268845.3

(51) Int. Cl.
G06F 12/02       (2006.01)
G06F 17/16       (2006.01)

(52) U.S. Cl.
CPC .......... G06F 12/0223 (2013.01); G06F 17/16 (2013.01)

(58) Field of Classification Search
CPC ............................ G06F 12/0223; G06F 17/16
See application file for complete search history.

(56) References Cited

U.S. PATENT DOCUMENTS

| | | | |
|---|---|---|---|
| 9,558,156 B1 * | 1/2017 | Bekas ...................... | G06F 17/16 |
| 10,409,887 B1 * | 9/2019 | Gauria ................ | G06F 12/0646 |
| 2021/0224039 A1 * | 7/2021 | Song ...................... | G06F 7/5443 |
| 2023/0229730 A1 * | 7/2023 | Mansell .............. | G06F 9/30032 |
| | | | 708/209 |

* cited by examiner

*Primary Examiner* — Prasith Thammavong

(57) ABSTRACT

Disclosed are an apparatus and a method for address generation, a data buffer, and an artificial intelligence chip. The apparatus includes address generating circuits, including N first address generating circuits and M second address generating circuits, where an n-th first address generating circuit generates a first address $y_n$ of each element in each of first matrices required for computations on an n-th first dimension according to $y_n = \text{floor}(a_n x_n + b_n) \times T_n$, and the first matrices are distributed along M second dimensions; and an m-th second address generating circuit generates a second address $y_m$ of each first matrix on an m-th second dimension according to $y_m = \text{floor}(a_m x_m + b_m) \times T_m$; and an address combining circuit generating an address for accessing each element in each first matrix by combining the second address of each first matrix on the M second dimensions and the first address of each element in each first matrix on N first dimensions.

13 Claims, 11 Drawing Sheets

The r-th address generating circuit in the R address generating circuits generates the address $y_r$ of each element in the matrix to be stored on the r-th dimension according to the function $y_r = \text{floor}(a_r x_r + b_r) \times T_r$          802

The address combining circuit generates the address for storing each element in the matrix by combining the addresses of each element in the matrix on the R dimensions          804

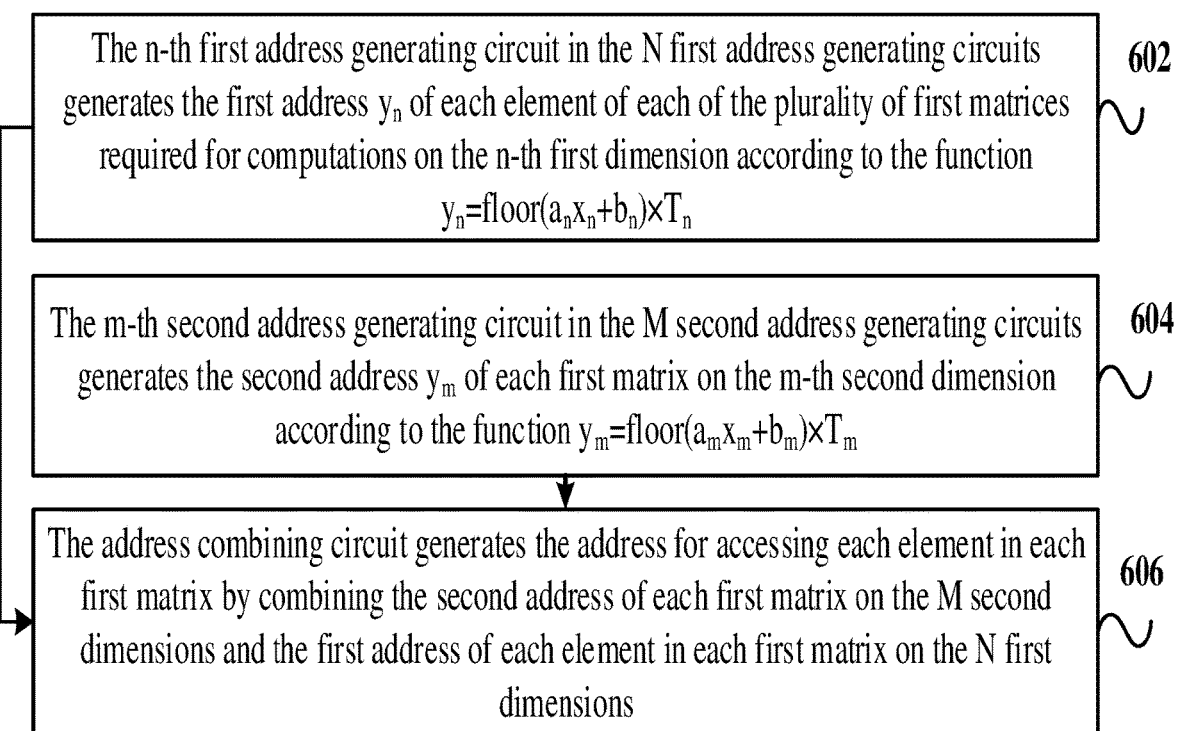

The n-th first address generating circuit in the N first address generating circuits generates the first address $y_n$ of each element of each of the plurality of first matrices required for computations on the n-th first dimension according to the function $y_n=\text{floor}(a_nx_n+b_n)\times T_n$                    602

The m-th second address generating circuit in the M second address generating circuits generates the second address $y_m$ of each first matrix on the m-th second dimension according to the function $y_m=\text{floor}(a_mx_m+b_m)\times T_m$                    604

The address combining circuit generates the address for accessing each element in each first matrix by combining the second address of each first matrix on the M second dimensions and the first address of each element in each first matrix on the N first dimensions                    606

FIG. 6

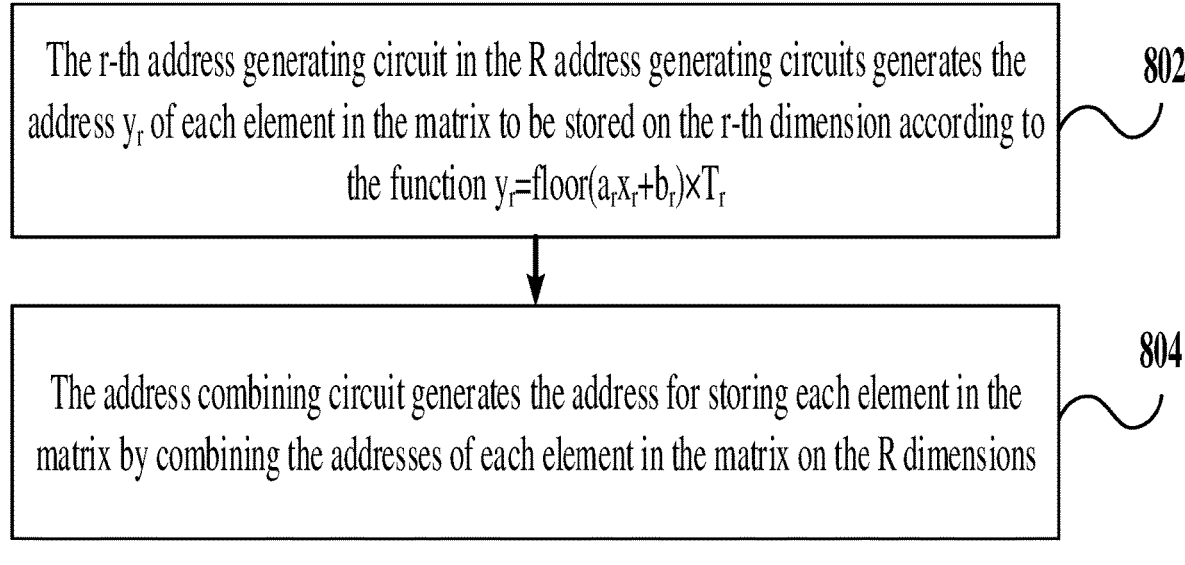

The r-th address generating circuit in the R address generating circuits generates the address $y_r$ of each element in the matrix to be stored on the r-th dimension according to the function $y_r = floor(a_r x_r + b_r) \times T_r$     802

The address combining circuit generates the address for storing each element in the matrix by combining the addresses of each element in the matrix on the R dimensions     804

FIG. 8

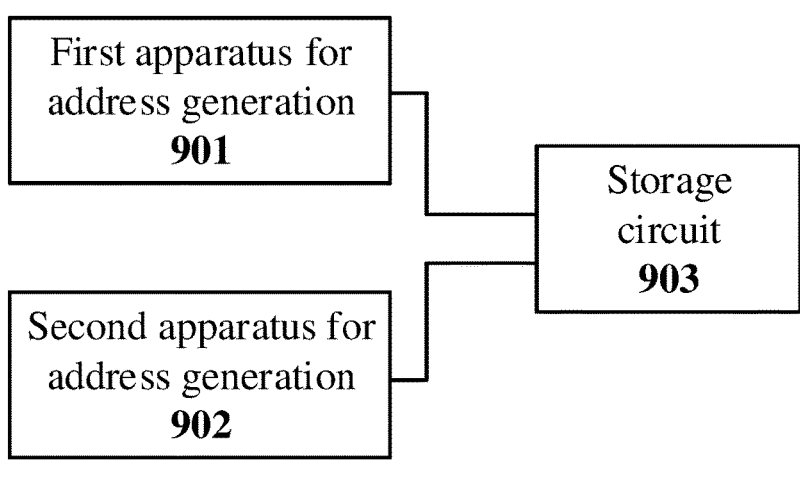

900

First apparatus for address generation 901

Storage circuit 903

Second apparatus for address generation 902

APPARATUS AND METHOD FOR ADDRESS GENERATION, DATA BUFFER, AND ARTIFICIAL INTELLIGENCE CHIP

CROSS REFERENCE TO RELATED APPLICATIONS

The present application claims the benefit of Chinese Patent Application No. 202210268845.3 filed on Mar. 18, 2022, the contents of which are incorporated herein by reference in their entirety.

TECHNICAL FIELD

The present disclosure relates to the field of artificial intelligence and, more particularly, to an apparatus and a method for address generation, a data buffer, and an artificial intelligence chip.

BACKGROUND

In recent years, artificial intelligence (AI) has been widely used in various industries. However, AI applications involve various complex computations. In the related art, AI chips may perform these computations to improve computational efficiency.

The AI chip includes a data buffer for buffering data and a computation circuit for performing computations. In the process of performing computations, the computation circuit can directly access data required for computations from the data buffer, so that the computational efficiency can be improved.

SUMMARY

The inventors have noted that in the related art, the versatility of AI chips is not high enough, that is, AI chips can only be used to perform one or a few types of computations and cannot be universally applied to a variety of computations.

The inventors have figured out that a major reason is the low versatility of an apparatus for address generation in the data buffer. Specifically, the apparatus for address generation generates the addresses of the elements in the matrix in a manner tailored to the matrix required for computation, so that the computation circuit accesses the corresponding elements and performs computation. However, due to differences in the matrices required for different computations (e.g., dimensions of a matrix, the number of elements at different positions on each dimension of a matrix, etc.), the apparatus for address generation customized for one type of matrices required for some of the computations is unable to generate addresses of elements in another type of matrices required for the others of the computations, and thus the AI chip is unable to perform the other computations.

In the related art, a plurality of apparatuses for address generation tailored to different matrices required for computations may be provided so that the AI chip can perform a variety of computations. However, in view of design complexity and area limitations, only a limited number of apparatuses for address generation can be provided, and the versatility is still not up to expectations.

To solve the above problems, embodiments of the present disclosure provide the following technical solution.

According to an aspect of the embodiments of the present disclosure, an apparatus for address generation is provided, including: a plurality of address generating circuits and an address combining circuit, wherein the plurality of address generating circuits include N first address generating circuits and M second address generating circuits. The N first address generating circuits correspond to N first dimensions on a one-to-one basis, wherein an n-th first address generating circuit is configured to generate a first address $y_n$ of each element in each first matrix in a plurality of first matrices required for computations on an n-th first dimension according to a function $y_n=\text{floor}(a_n x_n+b_n)\times T_n$, where $1\leq n\leq N$, elements at different positions on the n-th first dimension correspond to different values of $x_n$, values of $a_n$, $b_n$ and $T_n$ are such that the different values of $x_n$ correspond to different values of $y_n$, and the plurality of first matrices are distributed along M second dimensions. The M second address generating circuits are different from the N first address generating circuits and correspond to the M second dimensions on a one-to-one basis, wherein an m-th second address generating circuit is configured to generate a second address $y_m$ of each first matrix on an m-th second dimension according to a function $y_m=\text{floor}(a_m x_m+b_m)\times T_m$, where $1\leq m\leq M$, the first matrices at different positions on the m-th second dimension correspond to different values of $x_m$, and values of $a_m$, $b_m$ and $T_m$ are such that the different values of $x_m$ correspond to different values of $y_m$. The address combining circuit is configured to generate an address for accessing each element in each first matrix by combining the second address of each first matrix on the M second dimensions and the first address of each element in each first matrix on the N first dimensions.

According to another aspect of the embodiments of the present disclosure, a method for address generation is provided, including: generating a first address $y_n$ of each element in each first matrix in the plurality of first matrices required for computations on an n-th first dimension according to a function $y_n=\text{floor}(a_n x_n+b_n)\times T_n$ by an n-th first address generating circuit in N first address generating circuits, the N first address generating circuits corresponding to N first dimensions on a one-to-one basis, where $1\leq n\leq N$, elements at different positions on the n-th first dimension correspond to different values of $x_n$, values of $a_n$, $b_n$ and $T_n$ are such that the different values of $x_n$ correspond to different values of $y_n$, and the plurality of first matrices are distributed along M second dimensions; generating a second address $y_m$ of each first matrix on an m-th second dimension according to a function $y_m=\text{floor}(a_m x_m+b_m)\times T_m$ by an m-th second address generating circuit in M second address generating circuits, the M second address generating circuits being different from the N first address generating circuits and corresponding to M second dimensions on a one-to-one basis, where $1\leq m\leq M$, the first matrices at different positions on the m-th second dimension correspond to different values of $x_m$, and values of $a_m$, $b_m$ and $T_m$ are such that the different values of $x_m$ correspond to different values of $y_m$; and generating an address for accessing each element in each first matrix by an address combining circuit that combines the second address of each first matrix on the M second dimensions and the first address of each element in each first matrix on the N first dimensions.

According to yet another aspect of the embodiments of the present disclosure, an apparatus for address generation is provided, including: R address generating circuits corresponding to R dimensions on a one-to-one basis, wherein an r-th address generating circuit is configured to generate an address $y_r$ of each element in the matrix to be stored on an r-th dimension according to a function $y_r=\text{floor}(a_r x_r+b_r)\times T_r$, where $1\leq r\leq R$, elements at different positions on the r-th dimension correspond to different values of $x_r$, and values of $a_r$, $b_r$, and $T_r$ are such that the different values of $x_r$ correspond to different values of $y_r$, wherein the elements in the matrix are distributed along the R dimensions; and an address combining circuit configured to generate an address for storing each element in the matrix by combining the addresses of each element in the matrix on the R dimensions, wherein the addresses for storing different elements in the matrix are different.

According to still another aspect of the embodiments of the present disclosure, a method for address generation is provided, including: generating an address $y_r$ of each element in the matrix to be stored on an r-th dimension according to a function $y_r = \text{floor}(a_r x_r + b_r) \times T_r$, by an r-th address generating circuit in R address generating circuits, the R address generating circuits corresponding to R dimensions on a one-to-one basis, where $1 \leq r \leq R$, elements at different positions on the r-th dimension correspond to different values of $x_r$, and values of $a_r$, $b_r$, and $T_r$ are such that the different values of $x_r$ correspond to different $y_r$, wherein the elements in the matrix are distributed along the R dimensions; and generating an address for storing each element in the matrix by an address combining circuit that combines the addresses of each element in the matrix on the R dimensions, wherein the addresses for storing different elements in the matrix are different.

According to a further aspect of the embodiments of the present disclosure, a data buffer is provided, including: at least one of a first apparatus for address generation and a second apparatus for address generation, wherein the first apparatus for address generation is the apparatus for address generation according to any one of the embodiments above, and the second apparatus for address generation is the apparatus for address generation according to any one of the embodiments above; and a storage circuit configured to send each element in the plurality of first matrices according to the address for accessing each element in each first matrix, and store each element in the matrix according to the address for storing each element in the matrix.

According to a yet further aspect of the embodiments of the present disclosure, an artificial intelligence chip is provided, including the data buffer according to any one of the above embodiments.

According to a still further aspect of the embodiments of the present disclosure, an accelerator is provided, including the artificial intelligence chip according to any one of the above embodiments.

In the embodiments of the present disclosure, for each computation, the M second address generating circuits generate the second address for uniquely determining each of a plurality of matrices required for computations according to a function $y = \text{floor}(ax+b) \times T$, the N first address generating circuits generate the first address for uniquely determining each element in each matrix according to a function $y = \text{floor}(ax+b) \times T$, and the address combining circuit generates the address for accessing each element required for this computation by combining the second address of each first matrix on the M second dimensions and the first address of each element in each first matrix on the N first dimensions. By adjusting the values of a, b and T corresponding to each of the first address generating circuits and the second address generating circuits at each computation, the apparatus for address generation can be made to generate the address for accessing each element in different matrices required for different computations. As such, the versatility of the apparatus for address generation may be improved without additional design complexity and size.

The embodiments of the present disclosure are described in further detail below with reference to the accompanying drawings and embodiments.

BRIEF DESCRIPTION OF THE DRAWINGS

To illustrate the present disclosure or the technical solutions in the prior art more clearly, a brief description will be given below with reference to the accompanying drawings that are to be used in the description of the embodiments or the prior art; apparently, the drawings in the description below are only some of the embodiments of the present disclosure, and a person of ordinary skill in the art can readily obtain other drawings based on these drawings without involving any inventive effort.

FIG. 6 is a flowchart of a method for address generation according to some embodiments of the present disclosure;

FIG. 8 is a flowchart of the method for address generation according to other embodiments of the present disclosure;

FIG. 9 is a schematic diagram of a data buffer according to some embodiments of the present disclosure.

DETAILED DESCRIPTION OF THE INVENTION

Reference will now be made in detail to the embodiments of the present disclosure, technical solutions of which are illustrated clearly and fully in conjunction with the accompanying drawings. It is to be understood that the embodiments described are only a few, but not all embodiments of the present disclosure. Based on the embodiments in the present disclosure, all other embodiments obtained by a person of ordinary skill in the art without inventive effort fall within the scope of the present disclosure.

The relative arrangement of parts and steps, numerical expressions, and numerical values set forth in these embodiments do not limit the scope of the disclosure unless specifically stated otherwise.

Also, it should be understood that the dimensions of the various parts illustrated in the figures are not drawn to scale for ease of description.

Techniques, methods, and devices known to one of ordinary skill in the relevant art may not be discussed in detail but should be considered part of the written description where appropriate.

In all examples shown and discussed herein, any particular value should be interpreted as illustrative only and not as limiting. Thus, other examples of exemplary embodiments may have different values.

It should be noted that like numbers and letters refer to like items in the following figures, and thus, once an item is defined in one figure, further discussion thereof is not required in subsequent figures.

Figure 1:
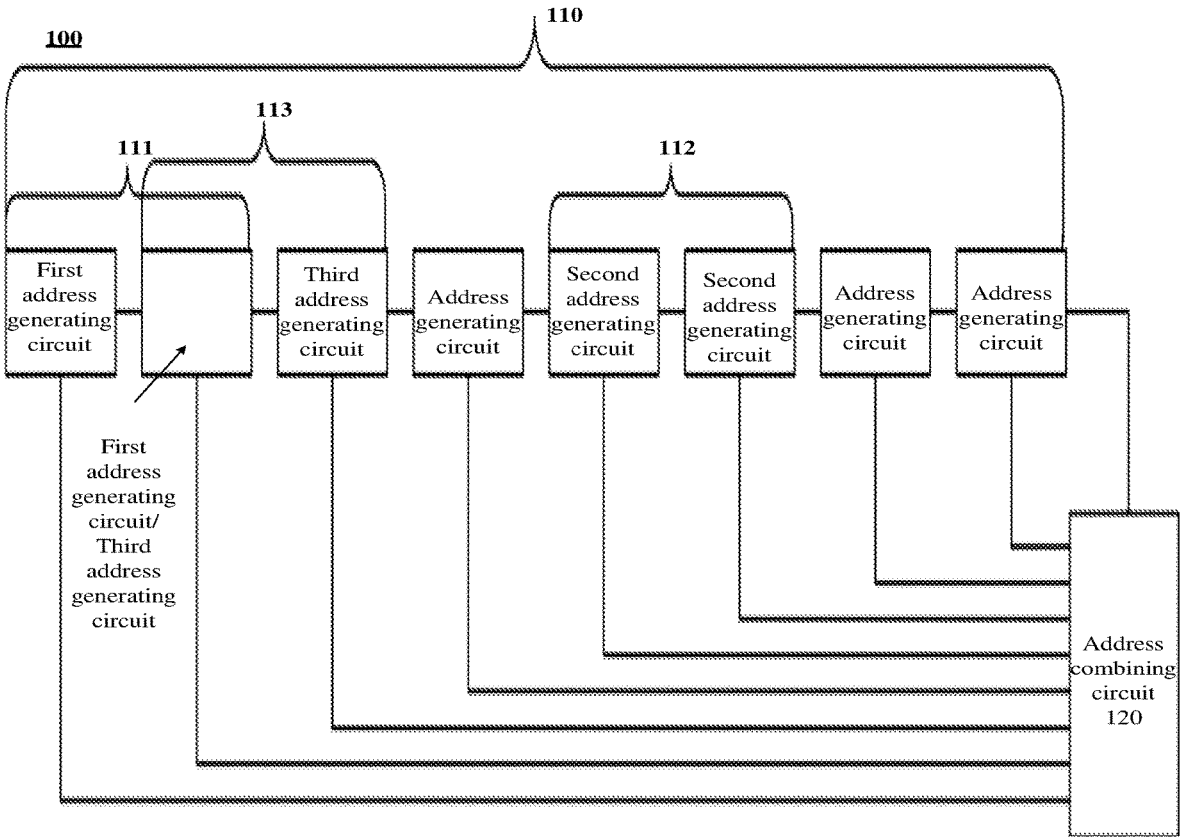
FIG. 1 is a block diagram of an apparatus for address generation according to some embodiments of the present disclosure.

FIG. 1 is a block diagram of an apparatus for address generation according to some embodiments of the present disclosure.

As shown in FIG. 1, the apparatus for address generation 100 includes a plurality of address generating circuits 110 and an address combining circuit 120. The plurality of address generating circuits 110 includes N first address generating circuits 111, and M second address generating circuits 112 different from the N first address generating circuits 111. N is an integer greater than or equal to 1, and M is also an integer greater than or equal to 1.

It should be understood that the plurality of address generating circuits 110 may include other address generating circuits in addition to the N first address generating circuits 111 and the M second address generating circuits 112. FIG. 1 schematically shows that the plurality of address generating circuits 110 include two first address generating circuits 111, two second address generating circuits 112, and four other address generating circuits.

The N first address generating circuits 111 correspond to N first dimensions on a one-to-one basis. That is, an n-th first address generating circuit in the N first address generating circuits 111 corresponds to an n-th first dimension in the N first dimensions, where $1 \leq n \leq N$.

The N first dimensions represent the dimensions of each of a plurality of first matrices required for computation, that is, the elements in each first matrix are distributed along the N first dimensions, and each first matrix is an N-dimensional matrix. The computation may be a computation in a neural network algorithm, for example, convolution, pooling, etc.

The plurality of first matrices required for computations are distributed along M second dimensions. The M second address generating circuits 112 correspond to the M second dimensions on a one-to-one basis. That is, an m-th second address generating circuit in the M second address generating circuits 112 corresponds to an m-th second dimension in the M second dimensions, where $1 \leq m \leq M$.

It should be understood that the N first dimensions may be identical with, partially identical with, or completely different from the M second dimensions. Taking convolution as an example, the N first dimensions may include at least one of a height dimension, a width dimension, a channel dimension, and a time dimension, and the M second dimensions may also include at least one of a height dimension, a width dimension, a channel dimension, and a time dimension.

The n-th first address generating circuit is configured to generate a first address $y_n$ of each element in each first matrix in the plurality of first matrices required for computations on the n-th first dimension according to a function $y_n = \text{floor}(a_n x_n + b_n) \times T_n$. Here, elements at different positions on the n-th first dimension correspond to different values of $x_n$, and values of $a_n$, $b_n$, and $T_n$ are such that the different values of $x_n$ correspond to different values of $y_n$. For example, a 1st first address generating circuit is configured to generate a first address $y_{n=1}$ of each element in each matrix in the plurality of first matrices required for computations on a 1st dimension according to a function $y_{n=1} = \text{floor}(a_{n=1} x_{n=1} + b_{n=1}) \times T_{n=1}$; a 2nd first address generating circuit is configured to generate a first address $y_{n=2}$ of each element in each matrix in the plurality of first matrices required for computations on a 2nd first dimension according to a function $y_{n=2} = \text{floor}(a_{n=2} x_{n=2} + b_{n=2}) \times T_{n=2}$, and so on.

Similarly, the m-th second address generating circuit is configured to generate a second address $y_m$ of each first matrix on the m-th second dimension according to a function $y_m = \text{floor}(a_m x_m + b_m) \times T_m$. Different first matrices on the m-th second dimension correspond to different values of $x_m$, and values of $a_m$, $b_m$, and $T_m$ are such that the different values of $x_m$ correspond to different values of $y_m$.

In other words, each first address generating circuit and each second address generating circuit are configured to generate the address y according to the function $y = \text{floor}(ax + b) \times T$, where x is a variable and a, b and T are constants. For example, a and T may take a value greater than 0, b may take a value greater than or equal to 0, and x may be an integer greater than or equal to 0. T may represent the mapping between floor(ax+b) and the address y.

It should be understood that the values of a, b and T may change or keep the same in the cases of different first address generating circuits, the values of a, b and T may change or keep the same in the cases of different second address generating circuits, and the values of a, b and T corresponding to any one of the first address generating circuits may be the same as or different from those corresponding to any one of the second address generating circuits.

It should also be understood that the values of a, b, T may change or keep the same for one first address generating circuit, and the values of a, b, T may change or keep the same for one second address generating circuit when different computations are performed. This will be described below with reference to examples.

The values of a, b, and T respectively corresponding to each of the first address generating circuits and the second address generating circuits can be flexibly configured according to actual computation requirements, so that the M second address generating circuits 112 generate the second address of each first matrix required for computations on the M second dimensions in the manner described above, and the N first address generating circuits 111 generate the first address of each element in each first matrix on the N first dimensions in the manner described above.

It will be appreciated that on a basis of the M second addresses of any first matrix on the M second dimensions, the first matrix may be uniquely determined from the plurality of first matrices. Furthermore, on a basis of the N first addresses of any element on the N first dimensions, the element can be uniquely determined in the first matrix where it belongs. In other words, an element in a first matrix can be uniquely determined on a basis of the second address of any first matrix on the M second dimensions and the first address of any element in the first matrix on the N first dimensions.

The address combining circuit 120 is configured to generate an address for accessing each element in each first matrix by combining the second address of each first matrix on the M second dimensions and the first address of each element in each first matrix on the N first dimensions.

For the convenience of explanation, the address generated by the address combining circuit 120 through combining for accessing elements is hereinafter referred to as an access address.

With reference to FIG. 1, the address combining circuit 120 may be coupled to each address generating circuit to receive the address y generated by each address generating circuit and combine to generate the access address of each element in each first matrix according to the received address y. Each element of the plurality of first matrices may, for example, have been stored in a storage circuit external to the apparatus for address generation 100, for example, a random-access memory (RAM). After combining to generate the access address of the element, the address combining circuit 120 may send the access address to the storage circuit. The storage circuit may send the elements of the plurality of first matrices required for computations to a computation circuit on a basis of the access address so that the computation circuit accesses the elements and performs the corresponding computation.

In some embodiments, the address combining circuit 120 may add the first address of each element in each first matrix on the N first dimensions to the second address of the first matrix on the M second dimensions to generate the access address of the element. In these embodiments, the access addresses of different elements in one first matrix are different.

In the above embodiment, for each computation, the M second address generating circuits 112 generate the second address for uniquely determining each matrix of the plurality of matrices required for this computation according to a function y=floor(ax+b)×T, and the N first address generating circuits 111 generate the first address for uniquely determining each element in each matrix according to the function y=floor(ax+b)×T, so that the address combining circuit 120 generates the address for accessing each element required for this computation by combining the second address of each first matrix on the M second dimensions and the first address of each element in each first matrix on the N first dimensions. By adjusting the values of a, b and T corresponding to each of the first address generating circuits and the second address generating circuits at each computation, the apparatus for address generation 100 can combine to generate the address for accessing each element in different matrices required for different computations. This may improve the versatility of the apparatus for address generation 100 without additional design complexity and size.

It will be appreciated that the number of the N first address generating circuits 111 may vary for different computations and that the number of the M second address generating circuits 112 may vary, too. For example, if each of the plurality of first matrices required for a computation is a 3-dimensional matrix, and the plurality of first matrices are distributed along two second dimensions, then M=2 and N=3; for another example, if each of the plurality of first matrices required for another computation is a 3-dimensional matrix and the plurality of first matrices are distributed along three second dimensions, then M=3 and N=3.

Further, the N first address generating circuits 111 may be different and the M second address generating circuits 112 may be different for different computations. For example, the plurality of address generating circuits 110 includes address generating circuits A, B, C, and D. For a computation, the N first address generating circuits 111 may be the address generating circuits A and B, and the M second address generating circuits 112 may be the address generating circuits C and D; for another computation, the N first address generating circuits 111 may be the address generating circuits C and D, and the M second address generating circuits 112 may be the address generating circuit A.

Figure 2A:
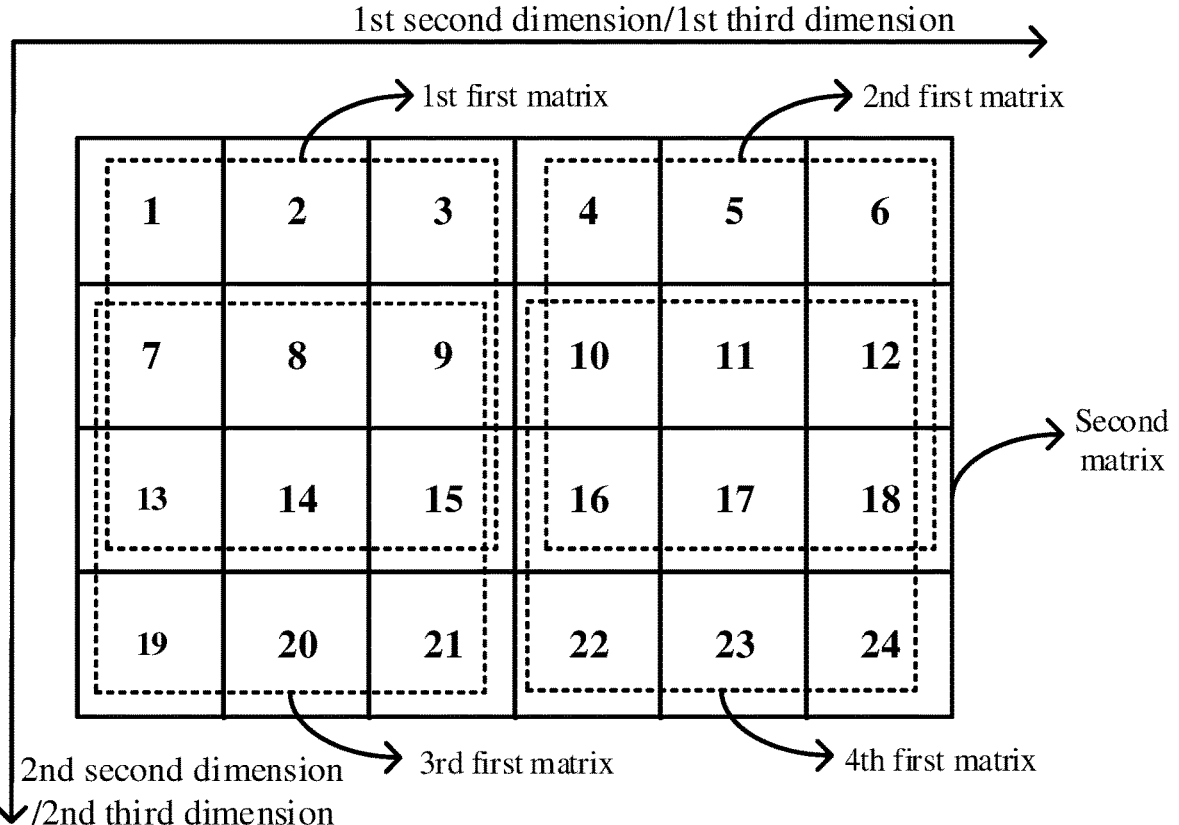
FIGS. 2A and 2B are schematic diagrams of a plurality of first matrices according to some embodiments of the present disclosure.
Figure 2B:
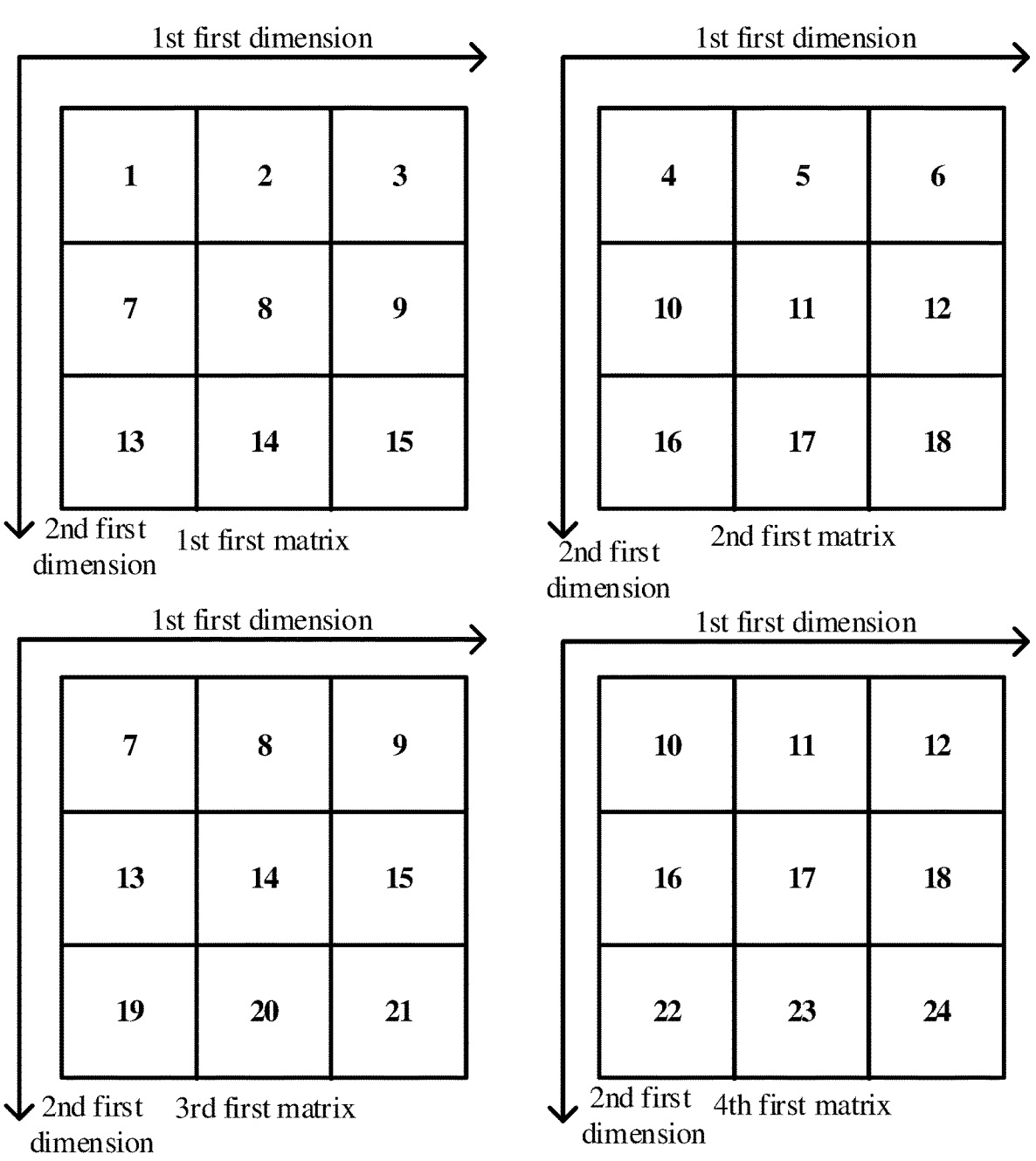

To facilitate understanding, the following description is made in conjunction with the example of FIGS. 2A and 2B. FIGS. 2A and 2B are schematic diagrams of a plurality of first matrices according to some embodiments of the present disclosure.

With reference to FIGS. 2A and 2B, each element of the four first matrices required for the computation is included in a 2-dimensional matrix of 6 (rows)×4 (columns) (i.e., a second matrix), and the elements at the same positions on the n-th first dimension in each first matrix belong to the elements at the same position on the n-th first dimension in the second matrix. Each first matrix is a 2-dimensional (i.e., N=2) matrix of 3 (rows)×3 (columns), and the four first matrices are distributed along two second dimensions (i.e., M=2). Here, the elements at different positions in each first matrix are the elements at different positions in the second matrix.

First, the first matrices at different positions on the m-th second dimension are described with reference to FIG. 2A. The width dimension is schematically represented in FIG. 2A as a 1st second dimension and the height dimension as a 2nd second dimension.

For the 1st second dimension, a 1st first matrix is at the same position on the 1st second dimension as a 3rd first matrix, and is at a different position on the 1st second dimension from a 2nd first matrix and a 4th first matrix; the 2nd first matrix is at a same position on the 1st second dimension as the 4th first matrix and at a different position on the 1st second dimension from the 1st first matrix and the 3rd first matrix. In other words, it is understood that there are two first matrices at different positions on the 1st second dimension, which correspond to different values of $x_{m=1}$; the first matrices at the same positions on the 1st second dimension correspond to the same values of $x_{m=1}$. For example, the 1st first matrix and the 3rd matrix correspond to $x_{m=1}=0$, and the 2nd first matrix and the 4th first matrix correspond to $x_{m=1}=1$.

Similarly, for the 2nd second dimension, the 1st first matrix is at the same position on the 2nd second dimension as the 2nd first matrix, and is at a different position on the 2nd second dimension from the 3rd first matrix and the 4th first matrix; the 3rd first matrix is at a same position on the 2nd second dimension as the 4th first matrix and at a different position on the 2nd second dimension from the 1st first matrix and the 2nd first matrix. In other words, it is understood that there are also two first matrices at different positions on the 2nd second dimension, which correspond to different values of $x_{m=2}$; the first matrices at the same positions on the 2nd second dimension correspond to the same values of $x_{m=2}$. For example, the 1st first matrix and the 2nd first matrix correspond to $x_{m=2}=0$; the 3rd first matrix and the 4th first matrix correspond to $x_{m=2}=1$.

The elements at different positions on the n-th first dimension are then described in connection with FIG. 2B. The width dimension is schematically represented in FIG. 2B as a 1st first dimension and the height dimension as a 2nd first dimension.

For the 1st first dimension, the first group of elements (including first-column elements in each first matrix) are at the same positions on the 1st first dimension; a second group of elements (including second-column elements in each first matrix) are at the same positions on the 1st first dimension; a third group of elements (including third-column elements in each first matrix) are at the same position on the 1st first dimension; the three groups of elements, i.e., the first, second, and third groups of elements, are respectively at different positions on the 1st first dimension. In other words, it is understood that each first matrix has three elements at different positions on the 1st first dimension, which correspond to different values of $x_{n=1}$; further, the elements in different first matrices at the same positions on the 1st first dimension correspond to the same $x_{n=1}$. For example, the first group of elements correspond to $x_{n=1}=0$; the second group of elements correspond to $x_{n=1}=1$; the third group of elements correspond to $x_{n=1}=2$.

Similarly, for the 2nd first dimension, a fourth group of elements (including first-row elements in each first matrix) are at the same positions on the 2nd first dimension; a fifth group of elements (including second-row elements in each first matrix) are at the same positions on the 2nd first dimension; a sixth group of elements (including third-row elements in each first matrix) are at the same positions on the 2nd first dimension; the three groups of elements, i.e., the fourth, fifth, and sixth group of elements, are respectively at different positions on the 2nd first dimension. In other words, it is understood that each first matrix also has three elements at different positions on the 2nd first dimension, which correspond to different values of $x_{n=2}$; further, the elements in different first matrices at the same positions on the 2nd first dimension correspond to the same $x_{n=2}$. For example, the fourth group of elements correspond to $x_{n=2}=0$; the fifth group of elements correspond to $x_{n=2}=1$; the sixth group of elements correspond to $x_{n=2}=2$.

Here, it is assumed that each element in the 2-dimensional matrix of 6 (rows)×4 (columns) shown in FIG. 2A has been stored in the storage circuit, and the value of each element is the address of the element in the storage circuit (i.e., the access address). That is, an element 1 has been stored in address "1", an element 2 has been stored in address "2", and so on for other elements.

For this computation, the values of a, b and T corresponding to each first address generating circuit and each second address generating circuit respectively, and the functions according to which the addresses are generated can be, for example, as shown in Table 1 below:

TABLE 1

| Address generating circuit | Value | Function |
| --- | --- | --- |
| 1st first address generating circuit | $a_{n-1} = 1$; $b_{n-1} = 0$; $T_{n-1} = 1$ | $y_{n-1} = floor(x_{n-1})$, $X_{n-1} = 0, 1, 2$ |
| 2nd first address generating circuit | $a_{n-2} = 6$; $b_{n-2} = 1$; $T_{n-2} = 1$ | $y_{n-2} = floor(6x_{n-1} + 1)$, $X_{n-2} = 0, 1, 2$ |
| 1st second address generating circuit | $a_{m-1} = 3$; $b_{m-1} = 0$; $T_{m-1} = 1$ | $y_{m-1} = floor(3x_{m-1})$, $X_{m-1} = 0, 1$ |
| 2nd second address generating circuit | $a_{n-1} = 6$; $b_{n-1} = 0$; $T_{n-1} = 1$ | $y_{m-2} = floor(6x_{m-2})$, $X_{m-1} = 0, 1$ |

First, the 1st first matrix is described as an example. The 1st first address generating circuit may first sequentially generate first addresses 0, 1 and 2 of elements 1, 2 and 3 (corresponding to $x_{n=1}$ being 0, 1 and 2 respectively) on the 1st first dimension, and the 2nd first address generating circuit may simultaneously generate first addresses 1, 1 and 1 of the elements 1, 2 and 3 (corresponding to $x_{n=2}$ being 0 respectively) on the 2nd first dimension. Moreover, the 1st second address generating circuit may generate a second address 0 of the 1st first matrix (corresponding to $x_{m=1}=0$) on the 1st second dimension, and the 2nd second address generating circuit may generate a second address 0 of the 1st first matrix (corresponding to $x_{m=2}=0$) on the 2nd second dimension. The address combining circuit 120 may add the first addresses of the elements 1, 2, 3 on the two first dimensions to the second addresses of the first matrix on the two second dimensions, respectively, to obtain the access addresses of the elements 1, 2, 3. That is, the access address of the element 1 is 0+1+0+0=1; the access address of the element 2 is 1+1+0+0=2; the access address of the element 3 is 2+1+0+0=3. Thereafter, two first address generating circuits 111 and two second address generating circuits 112 can sequentially generate the first addresses and the second addresses of elements 7 to 9 and 13 to 15 in a similar manner, and the address combining circuit 120 can also combine to generate the access addresses of the elements 7 to 9 and 13 to 15 in a similar manner, which will not be described in detail herein.

After generating the first address of each element in the 1st first matrix, the two first address generating circuits 111 and the two second address generating circuits 112 may generate addresses associated with the other first matrices in turn in a similar manner as described above, and will not be described in detail herein.

Figure 3A:
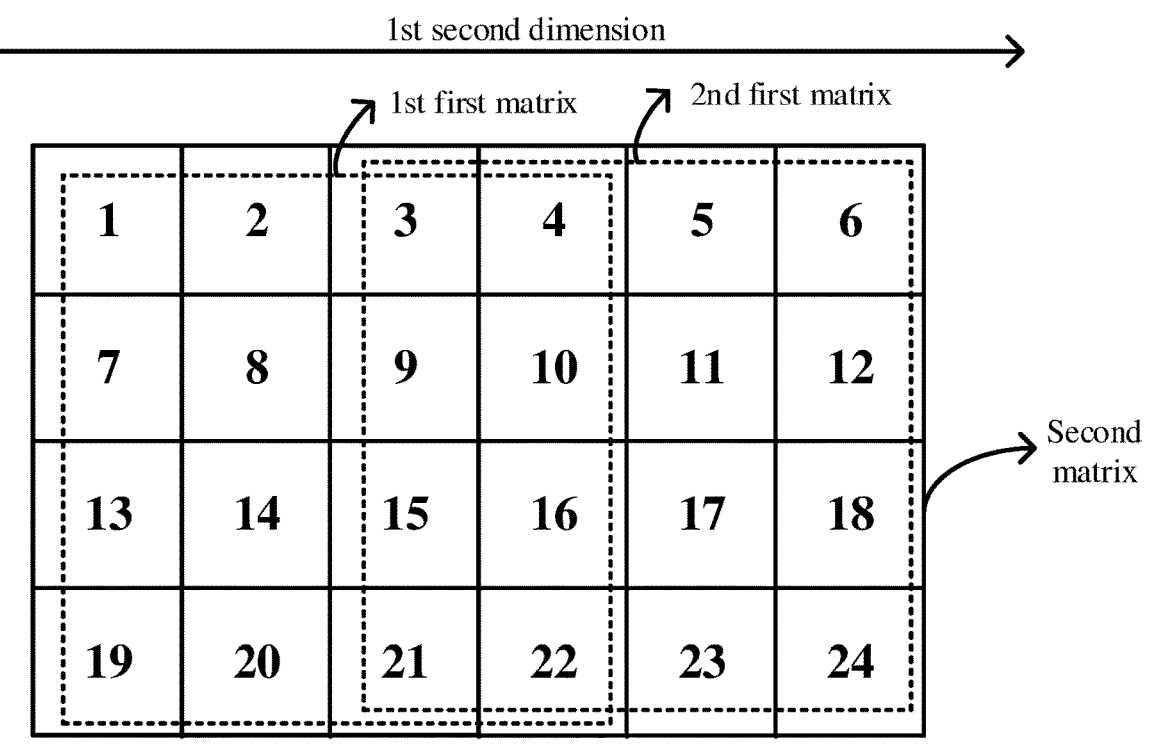
FIGS. 3A and 3B are schematic diagrams of the plurality of first matrices according to other embodiments of the present disclosure.
Figure 3B:
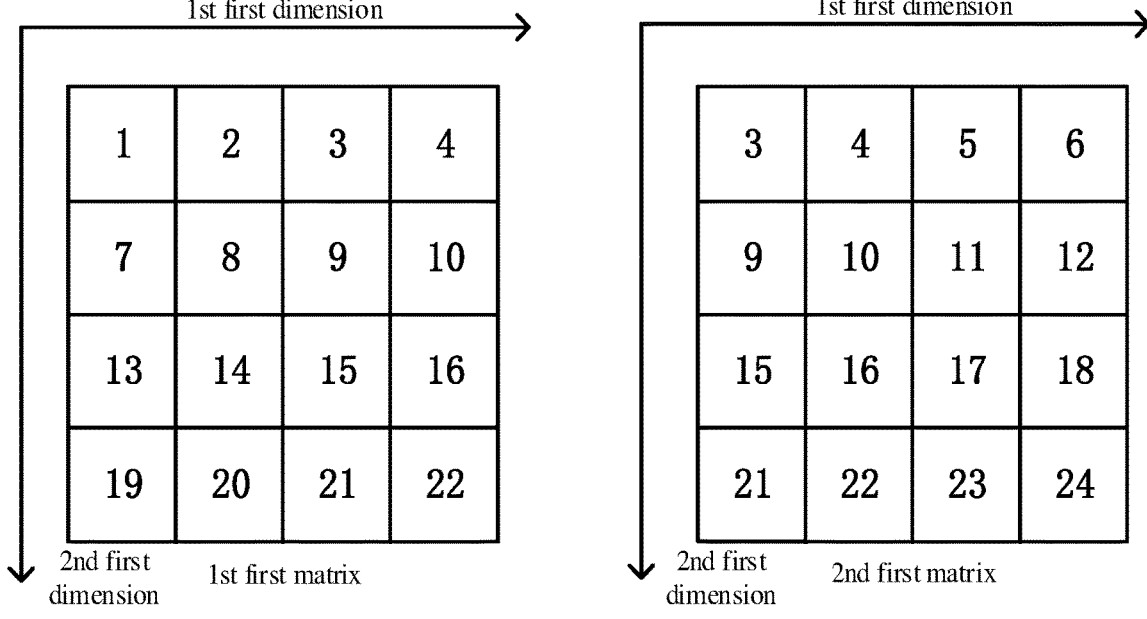

Reference is now made to FIGS. 3A and 3B. FIGS. 3A and 3B are schematic diagrams of the plurality of first matrices according to other embodiments of the present disclosure.

With reference to FIGS. 3A and 3B, each element in the two first matrices required for another computation is also included in a same 2-dimensional matrix of 6 (rows)×4 (columns), and the elements at the same positions on the n-th first dimension in each first matrix belong to the elements at the same positions on the n-th first dimension in the second matrix. Here, each first matrix is a 2-dimensional (i.e., N=2) matrix of 4 (rows)×4 (columns), and the 2 first matrices are distributed along one second dimension (i.e., M=1), which is the width dimension. Similar to FIG. 2B, FIG. 3B also schematically represents the width dimension as the 1st first dimension and the height dimension as the 2nd first dimension.

For these first matrices, for example, the values of a, b and T respectively corresponding to each first address generating circuit and each second address generating circuit, and the functions according to which the addresses are generated may be as shown in Table 2 below:

TABLE 2

| Address generating circuit | Value | Function |
| --- | --- | --- |
| 1st first address generating circuit | $a_{n-1} = 1$; $b_{n-1} = 0$; $T_{n-1} = 1$ | $y_{n-1} = floor(x_{n-1})$, $X_{n-1} = 0, 1, 2, 3$ |
| 2nd first address generating circuit | $a_{n-2} = 6$; $b_{n-2} = 1$; $T_{n-2} = 1$ | $y_{n-2} = floor(6x_{n-1} + 1)$, $X_{n-2} = 0, 1, 2, 3$ |
| 1st second address generating circuit | $a_{m-1} = 2$; $b_{m-1} = 0$; $T_{m-1} = 1$ | $y_{m-1} = floor(2x_{m-1})$, $X_{m-1} = 0, 1$ |

Here, the 2nd first matrix is described only as an example. The 1st first address generating circuit may first sequentially generate first addresses 0, 1, 2 and 3 of elements 3, 4, 5 and 6 (corresponding to $x_{n=1}$ being 0, 1, 2 and 3 respectively) on the 1st first dimension, and the 2nd first address generating circuit may simultaneously generate first addresses 1, 1, 1 and 1 of elements 3, 4, 5 and 6 (corresponding to $x_{n=2}$ being 0 respectively) on the 2nd first dimension. Moreover, the 1st second address generating circuit may generate a second address 2 of the 2nd first matrix (corresponding to $x_{m=1}=1$) on the 1st second dimension. The address combining circuit 120 may add the first addresses of the elements 3, 4, 5, 6 on the two first dimensions to the second addresses of the 2nd first matrix on the one second dimension, respectively, to obtain the access addresses of the elements 3, 4, 5, 6. That is, the access address of the element 3 is 0+1+2=3; the access address of the element 4 is 1+1+2=4; the access address of the element 5 is 2+1+2=5; the access address of the element 6 is 3+1+2=6. Thereafter, two first address generating circuits 111 and one second address generating circuit 112 may sequentially generate the first addresses and the second addresses of the elements 9 to 12, 15 to 18 and 21 to 24 in a similar manner, and the address combining circuit 120 may also combine to generate the access address of the elements 9 to 12, 15 to 18 and 21 to 24 in a similar manner, which will not be described in detail herein.

As can be seen from the examples of FIGS. 2A and 2B and FIGS. 3A and 3B, in the case where the matrix required for the computation is different, by configuring the values of a, b and T corresponding to the N first address generating circuits 111 and the M second address generating circuits 112 respectively to be different, the apparatus for address generation 100 can generate the access address of each element in the plurality of first matrices required for the computation so that the computation circuit performs the corresponding computation.

It should be understood that the plurality of first matrices shown in FIGS. 2A and 2B, and FIGS. 3A and 3B are merely exemplary. In practice, the plurality of first matrices may also be in other forms, as long as the element in each first matrix at a position on the n-th first dimension belongs to the element in the second matrix at the same position on the n-th first dimension.

Figure 3C:
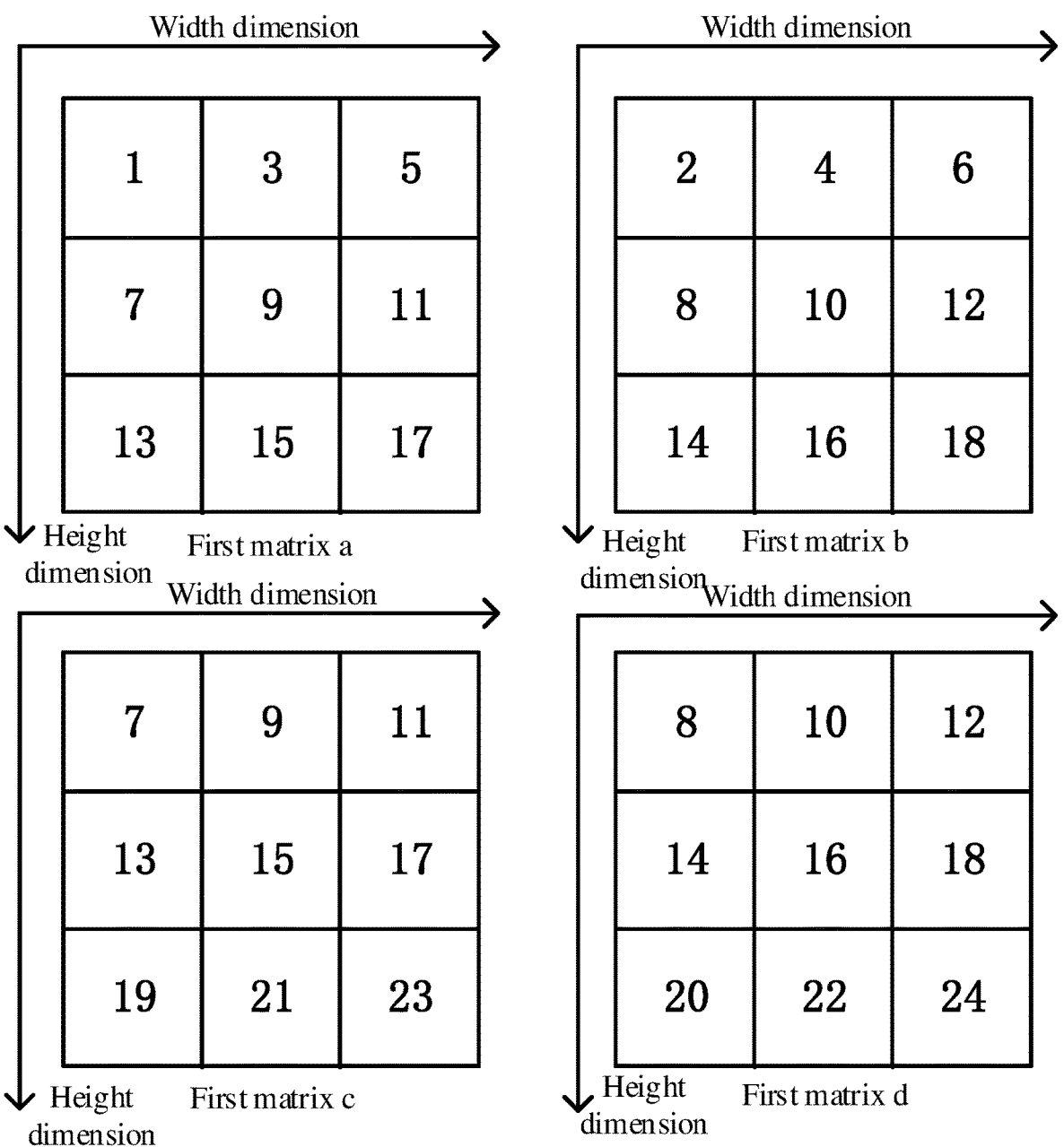
FIG. 3C is a schematic diagram of the plurality of first matrices according to further embodiments of the present disclosure.

Reference is now made to the example of FIG. 3C. FIG. 3C is a schematic diagram of the plurality of first matrices according to further embodiments of the present disclosure.

With reference to FIG. 3C, the first matrices a, b, c, and d required for the computation are all 3 (row)×3 (column) matrices, and each element of the first matrices a to d is also included in the second matrices shown in FIGS. 2A and 3A. In the first matrix a, elements 1, 3, 5 are first-row elements, elements 7, 9, 11 are second-row elements, and elements 13, 15 and 17 are third-row elements. In the first matrix b, elements 2, 4, 6 are first-row elements, elements 8, 10, 12 are second-row elements, and elements 14, 16, 18 are third-row elements. In the first matrix c, elements 7, 9, 11 are first-row elements, elements 13, 15, 17 are second-row elements, and elements 19, 21, 23 are third-row elements. In the first matrix d, elements 8, 10, 12 are first-row elements, elements 14, 16, 18 are second-row elements, and elements 20, 22, 24 are third-row elements.

In this case, the elements in each first matrix at the same positions on the n-th first dimension also belong to the elements in the second matrix at the same positions on the n-th first dimension.

To facilitate understanding, the description will first be made with an example of the elements at the same positions on the height dimension in the first matrix a. In the first matrix a, the first-row elements are at the same positions on the height dimension, the second-row elements are at the same positions on the height dimension, and the third-row elements are also at the same positions on the height dimension; the first-row elements, the second-row elements, and the third-row elements are each row at a different position from one another on the height dimension. In this case, the first-row elements in the first matrix a at the same positions on the height dimension belong to first-row elements in the second matrix at the same positions on the height dimension, the second-row elements in the first matrix a at the same positions on the height dimension belong to second-row elements in the second matrix at the same positions on the height dimension, and the third-row elements in the first matrix a at the same positions on the height dimension belong to third-row elements in the second matrix at the same positions on the height dimension.

The description is then made by taking an example of the elements at the same positions on the width dimension in the first matrix a. In the first matrix a, the first-column elements are at the same positions on the width dimension, the second-column elements are at the same positions on the width dimension, and the third-column elements are also at the same positions on the width dimension; the first-column elements, the second-column elements, and the third-column elements are each column respectively at a different position from one another on the width dimension. In this case, the first-column elements of the first matrix a at the same positions on the width dimension belong to first-column elements of the second matrix at the same positions on the width dimension, the second-column elements of the first matrix a at the same positions on the width dimension belong to third-column elements of the second matrix at the same positions on the width dimension, and the third-column elements of the first matrix a at the same positions on the width dimension belong to fifth-column elements of the second matrix at the same positions on the width dimension. The cases of other first matrices b to d may be similar to the above and will not be described in detail here.

It should be understood that for this example, the first matrices a to d are distributed along two second dimensions (i.e., the height dimension and the width dimension).

Specifically, for any first dimension, if elements in both a certain first matrix and another first matrix at the same positions on the first dimension belong to elements in a second matrix at the same positions on the first dimension, the two first matrices are at the same positions on the first dimension; otherwise, the two first matrices are at different positions on the first dimension.

For example, for the width dimension, the first-column elements in the first matrices a and c both belong to the first-column elements in the second matrix, while the first-column elements in the first matrices b and d do not belong to the first-column elements in the second matrix; the second-column elements in the first matrices a and c both belong to the third-column elements in the second matrix, while the second-column elements in the first matrices b and d do not belong to the third-column elements in the second matrix; furthermore, the third-column elements in the first matrices a and c both belong to the fifth-column elements in the second matrix, while the third-column elements in the first matrices b and d do not belong to the fifth-column elements in the second matrix. In this case, the first matrix a is at the same position on the width dimension as the first matrix c, and at a different position on the width dimension from the first matrices b and d.

Similarly, the first matrix b is at the same position on the width dimension as the first matrix d, and at a different position on the width dimension from the first matrices a and c, which will not be repeated here.

As another example, for the height dimension, the first-row elements in the first matrices a and b both belong to the first-row elements in the second matrix, while the first-row elements in the first matrices c and d do not belong to the first-row elements in the second matrix; the second-row elements in the first matrices a and b both belong to the second-row elements in the second matrix, while the second-row elements in the first matrices c and d do not belong to the second-row elements in the second matrix; furthermore, the third-row elements in the first matrices a and b both belong to the third-row elements in the second matrix, while the third-row elements in the first matrices c and d do not belong to the third-row elements in the second matrix. In this case, the first matrix a is at the same position on the height dimension as the first matrix b, and at a different position on the height dimension than the first matrices c and d.

Similarly, the first matrix c is at the same position on the height dimension as the first matrix d, and at a different position on the height dimension than the first matrices a and b. No further description will be given here.

By configuring the values of a, b and T corresponding to each of the N first address generating circuits 111 and the M second address generating circuits 112, the apparatus for address generation 100 can also generate the access address of each element of the first matrices a to d so that the computation circuit performs a corresponding computation. This will not be detailed here.

The apparatus for address generation 100 is further described below in connection with some embodiments.

In some embodiments, the elements at the same positions on the n-th first dimension in each first matrix required for computations belong to the elements at the same positions on the n-th first dimension in the second matrix (see FIGS. 2A and 3A). The second matrix includes a third matrix, and at least some of the elements in each first matrix belong to the third matrix. For example, the third matrix may be a feature map matrix and the second matrix may be the same as the third matrix or is a matrix composed of the third matrix and padding elements. For example, the padding element may surround the third matrix. Taking a 2-dimensional feature map matrix of 2 (rows)×2 (columns) as an example, the second matrix obtained after adding the padding elements is a 2-dimensional matrix of 4 (rows)×4 (columns), and each padding element is adjacent to an element on a boundary of the feature map matrix.

In these embodiments, the elements in the third matrix are distributed along R third dimensions, i.e., the third matrix is an R-dimensional matrix. Here, the R third dimensions include N first dimensions and M second dimensions. R is an integer greater than or equal to 1. Similarly, the R third dimensions may include at least one of a height dimension, a width dimension, a channel dimension, and a time dimension.

In these embodiments, the plurality of address generating circuits 110 in the apparatus for address generation 100 include R third address generating circuits 113 (see FIG. 1, two are schematically shown) corresponding to the R third dimensions on a one-to-one basis. That is, the r-th third address generating circuit in the R third address generating circuits 113 corresponds to the r-th third dimension in the R third dimensions, where 1≤r≤R.

For example, each third address generating circuit may be identical to a first address generating circuit, or may be identical to a second address generating circuit. As another example, each third address generating circuit is different from each first address generating circuit and each second address generating circuit, that is, each third address generating circuit is an address generating circuit other than the N first address generating circuits 111 and the M second address generating circuits 112 in the plurality of address generating circuits 110.

The r-th third address generating circuit is configured to generate a third address $y_r$ of each element in the third matrix on the r-th third dimension according to a function $y_r$=floor $(a_r x_r + b_r) \times T_r$. Similarly, elements at different positions on the r-th third dimension correspond to different values of $x_r$, and values of $a_r$, $b_r$, and $T_r$ are such that the different values of $x_r$ correspond to different values of $y_r$.

In other words, each third address generating circuit is also configured to generate an address y according to the function y=floor(ax+b)×T. Similarly, the respective values of a, b, T for each third address generating circuit may be flexibly configured such that the R third address generating circuits 113 generate the third address for each element of the third matrix to be stored in the manner described above.

In these embodiments, the address combining circuit 120 may be further configured to generate an address for storing each element in the third matrix by combining the third addresses of each element in the third matrix on the R third dimensions. Here, the addresses for storing the different elements in the third matrix are different.

For the convenience of explanation, the address generated by the address combining circuit 120 through combining for storing each element in the third matrix is hereinafter referred to as a storage address.

In the above embodiment, the R third address generating circuits 113 generate the third address of each element in the third matrix according to the function y=floor(ax+b)×T, so that the address combining circuit 120 generates the address for storing each element in the third matrix by combining the third addresses of each element on the R third dimensions. As such, the apparatus for address generation 100 can generate both the access address of the element required for computations and the storage address of the element to be stored.

To facilitate understanding, an example will be described below in which the third matrix to be stored is the second matrix shown in FIG. 2A.

The second matrix shown in FIG. 2A is a 2-dimensional matrix of 6 (rows)×4 (columns). That is, the plurality of address generating circuits 110 include two third address generating circuits 113 corresponding to the 1st third dimension and the 2nd third dimension, respectively. The width dimension is schematically represented in FIG. 2A as the 1st third dimension and the height dimension as the 2nd third dimension. The second matrix has six elements at different positions on the 1st third dimension, which are respectively a first-column element to a sixth-column element, and values of $x_{r=1}$ corresponding thereto are respectively equal to 0, 1, 2, 3, 4 and 5. The second matrix has four elements at different positions on the 2nd third dimension, which are respectively a first-row element to a fourth-row element, and values of $x_{r=2}$ corresponding thereto are respectively equal to 0, 1, 2 and 3.

In this case, the values of a, b and T respectively corresponding to each third address generating circuit and the function according to which the address is generated may be, for example, as shown in Table 3 below:

TABLE 3

| Address generating circuit | Value | Function |
|---|---|---|
| 1st third address generating circuit | $a_{r=1} = 1$; $b_{r=1} = 0$; $T_{r=1} = 1$ | $y_{r=1} = \text{floor}(X_{r=1})$, $x_{r=1} = 0, 1, 2, 3, 4, 5$ |
| 2nd third address generating circuit | $a_{r=2} = 6$; $b_{r=2} = 1$; $T_{r=2} = 1$ | $y_{r=2} = \text{floor}(6x_{r=1} + 1)$, $x_{r=2} = 0, 1, 2, 3$ |

Taking the first-row elements (i.e., elements 1 to 6) as an example, the third addresses of the first-row elements on the 2nd third dimension are all 1, while the third addresses thereof on the 1st third dimension are 0, 1, 2, 3, 4, 5, respectively. As such, the address combining circuit 120 may combine to generate storage addresses 1, 2, 3, 4, 5, 6 of the six elements in the first-row elements.

The apparatus for address generation 100 is further described below in connection with some other embodiments.

In some embodiments, the number of the plurality of address generating circuits 110 is greater than or equal to six. In this manner, the apparatus for address generation 100 can generate addresses of more elements in the matrix required for computations, so that the versatility of the apparatus for address generation 100 can be further improved.

In some embodiments, the number of the plurality of address generating circuits 110 is eight. In this manner, the apparatus for address generation 100 can generate addresses of more elements in the matrix required for computations, so that the versatility of the apparatus for address generation 100 can be further improved.

In some embodiments, each first matrix includes elements at P positions distributed along the n-th first dimension, where $P \geq 2$, and an element at an i-th position is adjacent to an element at an (i+1)-th position of the elements at the P positions, where $1 \leq i \leq P-1$. Further, the plurality of first matrices required for computations include first matrices at Q positions distributed along the m-th second dimension, where $Q \geq 2$, and a first matrix at a j-th position is adjacent to a first matrix at a (j+1)-th position in the first matrices at the Q positions, where $1 \leq j \leq Q-1$.

It will be appreciated that the numbers of elements at the P positions distributed along different first dimensions may be the same or different and that the numbers of first matrices at the Q positions distributed along different second dimensions may be the same or different.

In these embodiments, the n-th first address generating circuit is configured to sequentially generate the first addresses $y_n$ of each element in each first matrix in an order from a 1st position to a P-th position, and the m-th second address generating circuit is configured to sequentially generate the second address $y_m$ of each first matrix in an order from a 1st position to a Q-th position.

In the above embodiment, the N first address generating circuits 111 generate the first addresses of the elements in the first matrix in the above-specified order, and the M second address generating circuits 112 generate the second addresses of the first matrix in the above-specified order. In this manner, the address combining circuit 120 can determine more accurately which element the received first address corresponds to and which first matrix the second address corresponds to, so that the access address of each element in each first matrix can be generated more accurately through combining.

In some embodiments, the R third address generating circuits 113 also generate the third addresses of the elements in the third matrix in a particular order similar to that described above. This will not be repeated here.

In some embodiments, a (k−1)-th second address generating circuit of the M second address generating circuits 112 is configured to generate a second address $y_{m=k-1}$ of the first matrix at each position on a (k−1)-th second dimension when a k-th second address generating circuit generates a second address $y_{m=k}$ of the first matrix at any one position on a k-th second dimension. Here, $2 \leq k \leq M$.

Further, an N-th first address generating circuit is configured to generate a first address $y_{n=N}$ of the element at each position on an N-th first dimension when the 1st second address generating circuit generates a second address $y_{m=1}$ of the first matrix at any one position on the 1st second dimension.

Yet further, an (s−1)-th first address generating circuit is configured to generate a first address $y_{n=s-1}$ of the element at each position on an (s−1)-th first dimension when an s-th first address generating circuit generates a first address $y_{n=s}$ of the element at any one position on an s-th first dimension. Here, $2 \leq s \leq N$.

For ease of understanding, the description is still based on the example shown in FIGS. 2A and 2B. The k-th second address generating circuit (in the case of two second dimensions, the k-th second address generating circuit is the M-th second address generating circuit, i.e., the 2nd second address generating circuit) sequentially generates a second address $y_{m=2}$ of the first matrices at two different positions distributed along the 2-th second dimension in an order from a 1st position to a 2nd position.

That is, the 2nd second address generating circuit first generates the second address $y_{m=2}=0$ of the first matrix at the 1st position. During this time, the (k−1)-th (i.e., the 1st) second address generating circuit sequentially generates the second addresses $y_{m=1}$ of the first matrices at the two different positions distributed along the 1st second dimension in an order from the 1st position to the 2nd position, which are equal to 0 and 3, respectively. After the 1st second address generating circuit generates the second address $y_{m=1}$ of the first matrices at the two different positions, the 2nd second address generating circuit continues to generate a second address $y_{m=2}=6$ of the first matrix at the 2nd position. During this time, the 1st second address generating circuit generates the second addresses $y_{m=1}$ of the first matrices at the two different positions distributed along the 1st second dimension, which are equal to 0 and 3, respectively, again in an order from the 1st position to the second position. Thus, the address combining circuit 120 can sequentially obtain two second addresses of the 1st to 4th first matrices on two second dimensions.

When the 1st second address generating circuit generates the first address $y_{m=1}$ of the first matrix at any one position on the 1st second dimension, the N-th (i.e., the 2nd) first address generating circuit sequentially generates first addresses $y_{n=2}$ of the elements at three different positions distributed along the 2nd first dimension in an order from a 1st position to a 3rd position, which are equal to 1, 7 and 13, respectively. When the 2nd first address generating circuit generates the first address $y_{n=2}$ of the element at any one position on the 2nd first dimension, for example, during the generation of an address 1 by the 2nd first address generating circuit, the (s−1)-th (i.e., the 1st) first address generating circuit sequentially generates first addresses $y_{n=1}$ of elements at 3 different positions distributed along the 1st first dimension in an order from a 1st position to a 3rd position, which are equal to 0, 1 and 2, respectively. In this manner, the address combining circuit 120 may sequentially obtain the two first addresses of each element in the first matrix on the two first dimensions while obtaining the two second addresses of each first matrix on the two second dimensions.

In these embodiments, the address combining circuit 120 may sequentially obtain the second address of each first matrix on the M second dimensions and sequentially obtain the first address of each element in the first matrix on the N first dimensions while obtaining the second address of each first matrix on the M second dimensions. Then, each time the first address generated by the 1st first address generating circuit changes, the address combining circuit 120 can generate an access address of an element by combining the M second addresses and the N first addresses currently available, so that the access address of each element in each first matrix can be generated through combining sequentially. In this manner, each time the address combining circuit 120 combines to generate an access address of an element, the storage circuit may send the corresponding element to the computation circuit. In other words, the apparatus for address generation 100 may continuously generate addresses like a flow so that the storage circuit continuously sends elements like a flow. In this manner, the efficiency of subsequent computations can be improved.

Similarly, in some embodiments, the (d−1)-th third address generating circuit is configured to generate a third address $y_{r=d-1}$ ($2 \leq d \leq R$) of an element at each position on the (d−1)-th third dimension when the d-th third address generating circuit generates a third address $y_{r=d}$ of an element at any one position on the d-th third dimension. In this manner, the address combining circuit 120 may sequentially obtain the third address of each element in the third matrix on R third dimensions. Then, each time the third address $y_{r=1}$ generated by the 1st third address generating circuit changes, the address combining circuit 120 can generate the storage address of an element by combining the R third addresses currently available, so that the storage address of each element in the third matrix can be generated through combining sequentially. In this manner, each time the address combining circuit 120 combined to generate a storage address of an element, the storage circuit may store the corresponding element. That is, the apparatus for address generation 100 may continuously generate the address of each element in the third matrix like a flow so that the storage circuit may continuously store each element in the third matrix like a flow. In this way, the speed of data caching can be increased, so that the efficiency of subsequent computations can be further improved.

As some implementations, in generating the address y, each address generating circuit may communicate with a control register so that the control register instructs each address generating circuit when to generate the address y of an element/first matrix at a next position and when to stop generating the address y (e.g., after the plurality of address generating circuits 110 complete the generation of the second addresses of all first matrices and the first addresses of all elements, or after the generation of the third addresses for all elements in the third matrix).

As further implementations, with reference to FIG. 1, each address generating circuit is coupled one-to-one to the address combining circuit 120. In generating the address y, communication may occur between different address generating circuits, and between the address generating circuits and the address combining circuit 120, so that each address generating circuit determines when to generate the address y of the element/first matrix at the next position, and when to stop generating the address y.

In some embodiments, the number of the plurality of address generating circuits 110 is greater than N+M, that is, the plurality of address generating circuits 110 further include other address generating circuits than the N first address generating circuits 111 and the M second address generating circuits 112. In these embodiments, the other address generating circuit may be configured to be in a particular mode when generating the second address of each first matrix by the M second address generating circuits 112 and the first address of each element by the N first address generating circuits 111. The address generating circuit may be configured to continuously generate an address 0 in the particular mode. In this manner, even if the address combining circuit 120 receives addresses from the other address generating circuits than the N first address generating circuits 111 and the M second address generating circuits 112 among the plurality of address generating circuits 110 in combining to generate the access addresses of the elements in the plurality of first matrices, the accuracy of the generated access addresses of the elements is not affected, hence the accuracy of generating addresses by the apparatus for address generation 100 can be improved.

Similarly, in some embodiments, the number of the plurality of address generating circuits 110 is greater than R, that is, the plurality of address generating circuits 110 further includes other address generating circuits than the R third address generating circuits 113. In these embodiments, the other address generating circuit may be configured to be in a particular mode when generating the third address of each element in the third matrix by the R third address generating circuits 113. This will not be repeated here.

Some implementations of the address generating circuits are described below in conjunction with FIGS. 4A and 4B.

Figure 4A:
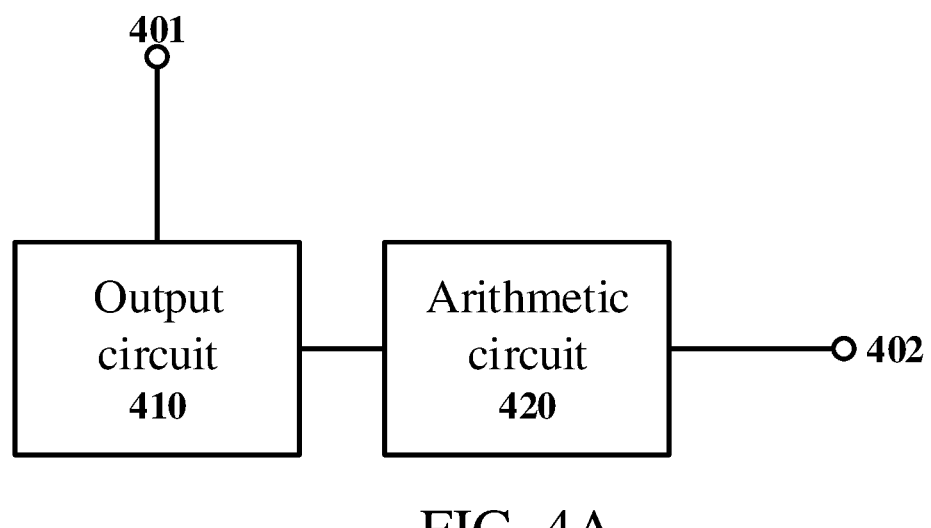
FIG. 4A is a schematic diagram of an address generating circuit according to some embodiments of the present disclosure.

FIG. 4A is a schematic diagram of an address generating circuit according to some embodiments of the present disclosure.

As shown in FIG. 4A, the address generating circuits include an output circuit 410 and an arithmetic circuit 420. The address generating circuit shown in FIG. 4A may be the first address generating circuit, the second address generating circuit, or the third address generating circuit.

The output circuit 410 may be configured to output a variable x in the function $y=\text{floor}(ax+b) \times T$. For example, the output circuit 410 may be coupled to the control register via a terminal 401 to output a corresponding x in response to a control signal from the control register.

For example, the address generating circuit shown in FIG. 4A is an n-th first address generating circuit, and the output circuit 410 (i.e., a first output circuit) may be configured to output $x_n$ corresponding to each element in each first matrix. As another example, the address generating circuit shown in FIG. 4A is an m-th second address generating circuit, and the output circuit 410 (i.e., a second output circuit) may be configured to output $x_m$ corresponding to each first matrix. As another example, the address generating circuit shown in FIG. 4A is an r-th third address generating circuit, and the output circuit 410 may be configured to output $x_r$ corresponding to each element in the third matrix.

The arithmetic circuit 420 may be configured to calculate an intermediate address IA of each element/first matrix on a corresponding dimension on a basis of a formula $IA=\text{floor}(a) \times T \times x + \text{floor}(b) \times T$. With reference to FIG. 4A, the arithmetic circuit 420 may be coupled to the output circuit 410 to calculate the intermediate address IA on a basis of x output by the output circuit 410.

For example, the address generating circuit shown in FIG. 4A is an n-th first address generating circuit, and the arithmetic circuit 420 (i.e., the first arithmetic circuit) may be configured to calculate an intermediate address $IA_n$ (i.e., a first intermediate address) of each element in each first matrix on the n-th first dimension on a basis of a formula $IA_n=\text{floor}(a_n) \times T_a \times x_n + \text{floor}(b_n) \times T_n$. As another example, the address generating circuit shown in FIG. 4A is an m-th second address generating circuit, and the arithmetic circuit 420 (i.e., a second arithmetic circuit) may be configured to calculate an intermediate address $IA_m$ (i.e., a second intermediate address) of each first matrix on the m-th second dimension on a basis of a formula $IA_m=floor(a_m)\times T_m\times x_m+floor(b_m)\times T_m$. As another example, the address generating circuit shown in FIG. 4A is an r-th third address generating circuit, and the arithmetic circuit 420 may be configured to calculate an intermediate address $IA_r$ of each element in the third matrix on the r-th third dimension on a basis of a formula $IA_r=floor(a_r)\times T_r\times x_r+floor(b_r)\times T_r$.

In some cases, the intermediate address IA of an element/ first matrix on the corresponding dimension is equal to $floor(ax+b)\times T$, i.e., $floor(a)\times T\times x+floor(b)\times T=floor(ax+b)\times T$. The arithmetic circuit 420 may be configured to directly use the intermediate address IA as the address y generated by the address generating circuit, with $IA=floor(ax+b)\times T$. In other cases, the intermediate address IA of an element/first matrix on the corresponding dimension is not equal to $floor(ax+b)\times T$, i.e., $floor(a)\times T\times x+floor(b)\times T\neq floor(ax+b)\times T$. The arithmetic circuit 420 may also be configured to calculate the address y on a basis of a formula $y=IA+floor((a-floor(a))\times x)\times T$, with $IA\neq floor(ax+b)\times T$. After obtaining the address y through calculation, the arithmetic circuit 420 may send the address y to the address combining circuit 120 via the terminal 402 coupled to the address combining circuit 120.

For example, if the address generating circuit shown in FIG. 4A is the n-th first address generating circuit, then the arithmetic circuit 420 (i.e., the first arithmetic circuit) may be configured, for any element in any first matrix, to directly take the first intermediate address $IA_n$ of the element as the first address $y_n$ in the case where $IA_n=floor(a_nx_n+b_n)\times T_n$, and in the case where $IA_n\neq floor(a_nx_n+b_n)\times T_n$, calculate to obtain the first address $y_n$ of the element on a basis of the formula $y_n=IA_n+floor((a_n-floor(a_n))\times x_n)\times T_n$.

As another example, if the address generating circuit shown in FIG. 4A is the m-th second address generating circuit, then the arithmetic circuit 420 (i.e., the second arithmetic circuit) may be configured, for any first matrix, to directly take the second intermediate address $IA_m$ of the first matrix as the second address $y_m$ in the case where $IA_m=floor(a_mx_m+b_m)\times T_m$, and in the case where $IA_m\neq floor(a_mx_m+b_m)\times T_m$, calculate to obtain the second address $y_m$ of the first matrix on a basis of the formula $y_m=IA_m+floor((a_m-floor(a_m))\times x_m)\times T_m$.

As another example, if the address generating circuit shown in FIG. 4A is the r-th third address generating circuit, then the arithmetic circuit 420 may be configured, for any one of the elements in the third matrix, directly take the third intermediate address $IA_r$ of the element as the third address $y_r$ in the case where $IA_r=floor(a_rx_r+b_r)\times T_r$, and, in the case where $IA_r\neq floor(a_rx_r+b_r)\times T_r$, calculate to obtain the third address $y_r$ of the element on a basis of the formula $y_r=IA_r+floor((a_r-floor(a_r))\times x_r)\times T_r$.

Thus, the address generating circuit may generate the address y according to the function $y=floor(ax+b)\times T$.

The output circuit 410 is further described below in connection with some embodiments.

In some embodiments, the variable x in the function $y=floor(ax+b)\times T$ is an integer greater than or equal to 0, and a difference between values of x corresponding to the elements/first matrices at any two adjacent positions on the corresponding dimension is consistent.

Taking $x_n$ as an example, $x_n$ corresponding to each element in each first matrix is an integer greater than or equal to 0, and the difference between values of $x_n$ corresponding to any two adjacent elements on the n-th first dimension is consistent. Taking $x_m$ as an example, $x_m$ corresponding to each first matrix is an integer greater than or equal to 0, and the difference between values of $x_m$ corresponding to any two adjacent first matrices on the m-th second dimension is consistent. Taking $x_r$ as an example, $x_r$ corresponding to each element in the third matrix is an integer greater than or equal to 0, and the difference between values of $x_r$ corresponding to any two adjacent elements on the r-th third dimension is consistent.

It should be understood that the difference between the values of $x_n$ corresponding to any two adjacently positioned elements on different first dimensions may be consistent or not, the difference between the values of $x_m$ corresponding to the first matrices at any two adjacent positions on different second dimensions may be consistent or not, and the difference between the values of $x_r$ corresponding to any two adjacently positioned elements on different third dimensions may also be consistent or not.

In these embodiments, before generating the address y by the address generating circuit, an initial value of x output by the output circuit 410 and an increment/decrement value are configured such that the output circuit 410 sequentially outputs x for each element/first matrix in a particular order (with the first output circuit as an example, the particular order may be from the 1st position to the P-th position). In this manner, it is possible to facilitate configuring the output circuit 410.

As some implementations, the output circuit 410 may include a counter.

In some embodiments, the variable x in the function $y=floor(ax+b)\times T$ is an integer greater than or equal to 0, and the difference between the values of x corresponding to elements/first matrices at any two adjacent positions on the corresponding dimension is 1. For example, the difference between $x_n$ corresponding to any two adjacent elements on the n-th first dimension is 1. In these embodiments, before generating the address y by the address generating circuit, the initial value of x output by the output circuit 410 is configured such that the output circuit 410 sequentially outputs x for each element/first matrix in a particular order. Thus, it is possible to further facilitate configuring the output circuit 410.

Some implementations of the arithmetic circuit 420 are described below in conjunction with FIG. 4B. FIG. 4B is a schematic diagram of the address generating circuit according to other embodiments of the present disclosure.

Figure 4B:
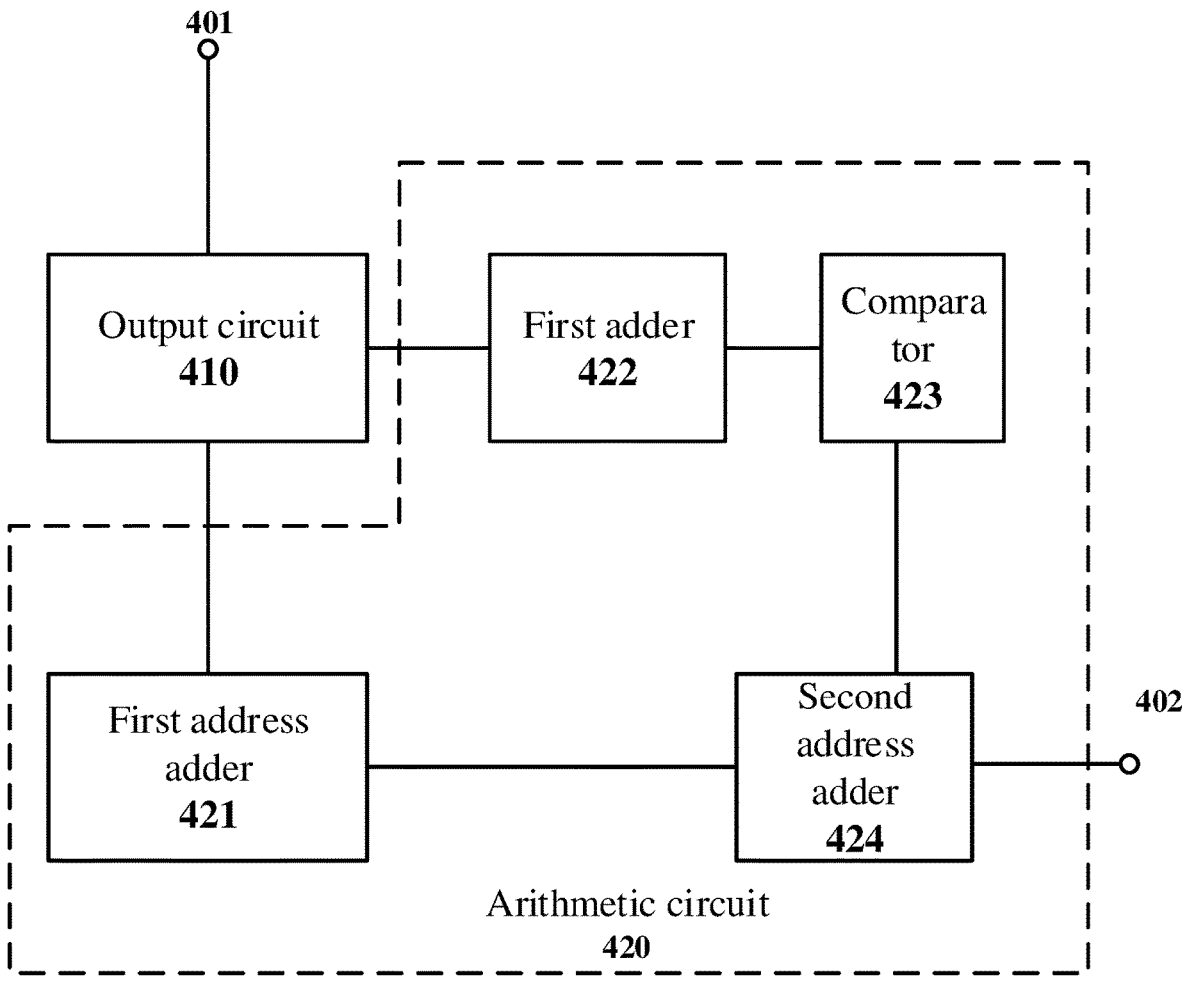
FIG. 4B is a schematic diagram of the address generating circuit according to other embodiments of the present disclosure.

As shown in FIG. 4B, the arithmetic circuit 420 includes a first address adder 421, a first adder 422, a comparator 423, and a second address adder 424.

With reference to FIG. 4B, the first address adder 421 may be coupled to the output circuit 410 to obtain x output by the output circuit 410. The first address adder 421 may be configured to calculate the intermediate address IA of each element/first matrix on a corresponding dimension on a basis of a formula $IA=floor(a)\times T\times x+floor(b)\times T$.

Similarly, the first adder 422 may be coupled to the output circuit 410 to obtain x output by the output circuit 410. The first adder 422 may be configured to calculate an offset value OV of each element/first matrix on a corresponding dimension on a basis of a formula $OV=floor((a-floor(a))\times x)$. For example, if a is an integer, then OV is equal to 0; if a is a non-integer, OV may not be equal to 0.

The comparator 423 may be coupled to the first adder 422 to obtain the offset value OV output by the first adder 422. The comparator 423 may be configured to determine, for any one of the elements/the first matrices, whether an absolute value of the offset value, OVI, is greater than or equal to 1, in the case of $|OV|\geq 1$, send a first indication signal, and in the case of $|OV|<1$, send a second indication signal. If the offset value $|OV|$ of any one element/first matrix is greater than or equal to 1, a determination can be made that the intermediate address IA of the element/first matrix on the corresponding dimension is not equal to floor(ax+b)×T; otherwise, if the offset value |OV| of any one element/first matrix is less than 1, a determination can be made that the intermediate address IA of the element/first matrix on the corresponding dimension is equal to floor(ax+b)×T.

The second address adder 424 may be coupled to the first address adder 421 to obtain the intermediate address IA, and the second address adder 424 may be further coupled to the comparator 423 to receive the first indication signal or the second indication signal. The second address adder 424 may be configured, for any one element/first matrix, to calculate the address y of the element/first matrix on the corresponding dimension in response to a first indication signal on a basis of a formula y=IA+floor((a−floor(a))×x)×T, and in response to the second indication signal, take the intermediate address IA of the element/first matrix on the corresponding dimension as the address y.

Similarly, the address generating circuit shown in FIG. 4B may be a first address generating circuit, a second address generating circuit, or a third address generating circuit.

Here, a case where the address generating circuit shown in FIG. 4B is the n-th first address generating circuit will be described only as an example. In this case, the first address adder 421 may be configured to calculate the first intermediate address $IA_n$ of each element in each first matrix on the corresponding dimension (i.e., the n-th first dimension) on a basis of the formula $IA_n=floor(a_n)\times T_n \times x_n + floor(b_n)\times T_n$. The first adder 422 may be configured to calculate the offset value $OV_n$ of each element in each first matrix on the n-th first dimension on a basis of the formula $OV_n=floor((a_n-floor(a_n))\times x_n)$. The comparator 423 may be configured to determine, for any element in any first matrix, whether the absolute value of the offset value, $|OV_n|$, is greater than or equal to 1, send a first indication signal in the case of the $|OV_n|\geq 1$, and in the case of |OVn|<1, send a second indication signal. The second address adder 424 may be configured, for any element in any first matrix, to calculate the first address $y_n$ of the element on the n-th first dimension in response to the first indication signal on a basis of the formula $y_n=IA_n+floor((a_n-floor(a_n))\times x_n)\times T_n$, and take the first intermediate address $IA_n$ of the element the first address $y_n$ in response to the second indication signal.

In this manner, the arithmetic circuit 420 can accurately calculate the address y according to the function y=floor(ax+b)×T.

As some implementations, the first adder 422 may include an accumulator.

As described above, in some embodiments, the variable x in the function y=floor(ax+b)×T is an integer greater than or equal to 0, the difference between the values of x corresponding to elements/first matrices at any two adjacent positions on a dimension is consistent, and the output circuit 410 may sequentially output x corresponding to each element/first matrix in a particular order.

In these embodiments, the accumulator may be configured to perform one accumulation each time x output by the output circuit 410 changes, so as to output the offset value OV. In addition, the accumulator may be configured to return to an initial value after the output circuit 410 outputs x corresponding to the element/first matrix at a last position.

Taking the difference between the values of $x_n$ corresponding to any two adjacent elements on the n-th first dimension being 1 as an example, the increment value for each accumulation may be set to be $floor(a_n-floor(a_n))$. Taking $x_n$ corresponding to the element at the 1st position on the n-th first dimension being 0 as an example, the initial value of the accumulator may be set to be 0.

Figure 5:
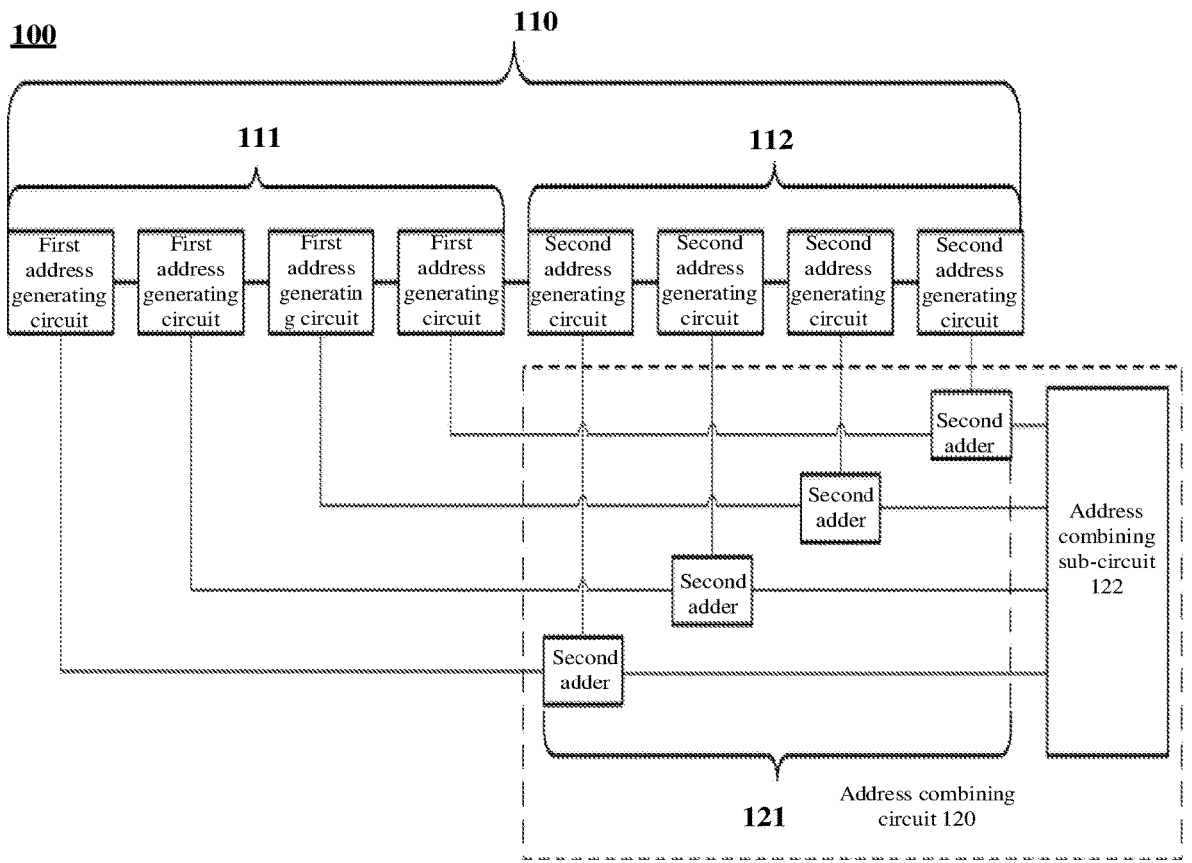
FIG. 5 is a block diagram of the apparatus for address generation according to other embodiments of the present disclosure.

Some implementations of the address combining circuit 120 are described below in conjunction with FIG. 5. FIG. 5 is a block diagram of the apparatus for address generation according to other embodiments of the present disclosure.

In some embodiments, the N first dimensions and the M second dimensions include a same at least one dimension. In these embodiments, as shown in FIG. 5, the address combining circuit 120 may include at least one second adder 121 (four shown schematically in FIG. 5) corresponding one-to-one to the at least one dimension, and an address combining sub-circuit 122.

With reference to FIG. 5, each of the second adders may be respectively coupled to a first address generating circuit and a second address generating circuit corresponding to the corresponding dimension. Each second adder may be configured to add the first address of each element in each first matrix on the corresponding dimension to the second address of the first matrix on the corresponding dimension to obtain a fourth address of each element on the corresponding dimension.

Taking the element 3 in the first matrix shown in FIG. 2A as an example, the first address of the element 3 on the 1st first dimension (i.e., the width dimension) is equal to 2, and the second address of the first matrix on the 1st second dimension (i.e., the same width dimension) where the element 3 is located is equal to 0, thus a second adder corresponding to the width dimension can calculate the fourth address of the element 3 on the corresponding dimension, which is 2+0=2.

Each second adder may also be coupled to the address combining sub-circuit 122 to send the calculated fourth address of each element on the corresponding dimension to the address combining sub-circuit 122.

The address combining sub-circuit 122 may be configured, for any of the same at least one dimension, to determine whether the fourth address of each element in each first matrix on the dimension belongs to a set of addresses for the dimension, so as to obtain a determination result for the dimension. Here, the set of addresses for any one dimension consists of the third address for each element in the third matrix on the dimension.

Taking the 1st third dimension (i.e., the width dimension) shown in FIG. 2A as an example, the third address of each element on the 1st third dimension includes 0, 1, 2, 3, 4, and 5, thus the set of addresses for the width dimension includes 0, 1, 2, 3, 4, and 5.

The address combining sub-circuit 122 is further configured to, for any element in each first matrix, adjust the fourth address of the element on a certain dimension to be the third address in a set of addresses of the element on the certain dimension if there is a certain dimension with a negative determination result in the same at least one dimension; after the adjustment, the fourth address on at least one dimension, the first address on a first dimension other than the at least one dimension of the N first dimensions, and the second address on a second dimension other than the at least one dimension of the M second dimensions of the element are added up to obtain the access address of the element.

It should be understood that the address obtained after adjusting the fourth address of any element on the certain dimension to be the third address of the set of addresses on the certain dimension is still referred to as the fourth address of the element on the certain dimension.

In addition, the address combining sub-circuit 122 may be further configured to, for each element in each first matrix, in the case where there is no certain dimension with a negative determination result in the same at least one dimension, directly add the fourth address on the at least one dimension, the first address on a first dimension other than the at least one dimension in N first dimensions, and the second address on a second dimension other than the at least one dimension in M second dimensions of the element to obtain the access address of the element.

In this manner, the address combining circuit 122 can accurately combine to generate the access addresses of each element in the plurality of first matrices.

As described above, in some embodiments, the third matrix may be a feature map matrix, and the second matrix may be different from the third matrix, but consist of the third matrix and padding elements surrounding the third matrix. In these embodiments, the adjustment described above may be performed for the padding elements and not for the elements in the feature map matrix.

In some embodiments, the padding elements are identical preset elements, for example, all being 0. In these embodiments, the address combining sub-circuit 122 is further configured to, for each padding element in each first matrix, send an indication signal at the same time as sending the access address of the padding element, so that the storage circuit automatically sends a corresponding one of the preset elements in response to the indication signal.

In other embodiments, each padding element is an element in the feature map matrix that is adjacent the padding element. In these embodiments, the address combining sub-circuit 122 is further configured to, for each padding element in each first matrix, adjust the fourth address of the padding element on a certain dimension to be the third address of an element in the feature map matrix that is adjacent the padding element on the certain dimension. In this manner, the address combining sub-circuit 122 may combine the access addresses of all the padding elements into the access address of the element in the feature map matrix that is adjacent to the padding element.

In some embodiments, before the apparatus for address generation 100 generates the access address of each element in the plurality of first matrices, the values of $a_n$, $b_n$ and $T_n$ corresponding to the n-th first address generating circuit and the values of $a_m$, $b_m$ and $T_m$ corresponding to the m-th second address generating circuit may be determined according to the address of each element in the third matrix stored in the storage circuit, the plurality of first matrices required for this computation, and the type of this computation. Then, the control register may be configured according to the values of $a_n$, $b_n$ and $T_n$ corresponding to the n-th first address generating circuit and the values of $a_m$, $b_m$ and $T_m$ corresponding to the m-th second address generating circuit, so that the control register configures the n-th first address generating circuit and the m-th second address generating circuit.

FIG. 6 is a flowchart of a method for address generation according to some embodiments of the present disclosure.

As shown in FIG. 6, the method for address generation includes steps 602 to 606.

In step 602, the n-th first address generating circuit in N first address generating circuits 111 generates the first address $y_n$ of each element of each of the plurality of first matrices required for computations on the n-th first dimension according to the function $y_n=floor(a_n x_n+b_n)\times T_n$.

In step 604, the m-th second address generating circuit in the M second address generating circuits 112 generates the second address $y_m$ of each first matrix on the m-th second dimension according to the function $y_m=floor(a_m x_m+b_m)\times T_m$.

In step 606, the address combining circuit 120 generates the address for accessing each element in each first matrix by combining the second address of each first matrix on the M second dimensions and the first address of each element in each first matrix on the N first dimensions.

As such, the access addresses for each element of the plurality of first matrices required for computations may be generated through combining in the manner of embodiments of the present disclosure.

Figure 7:
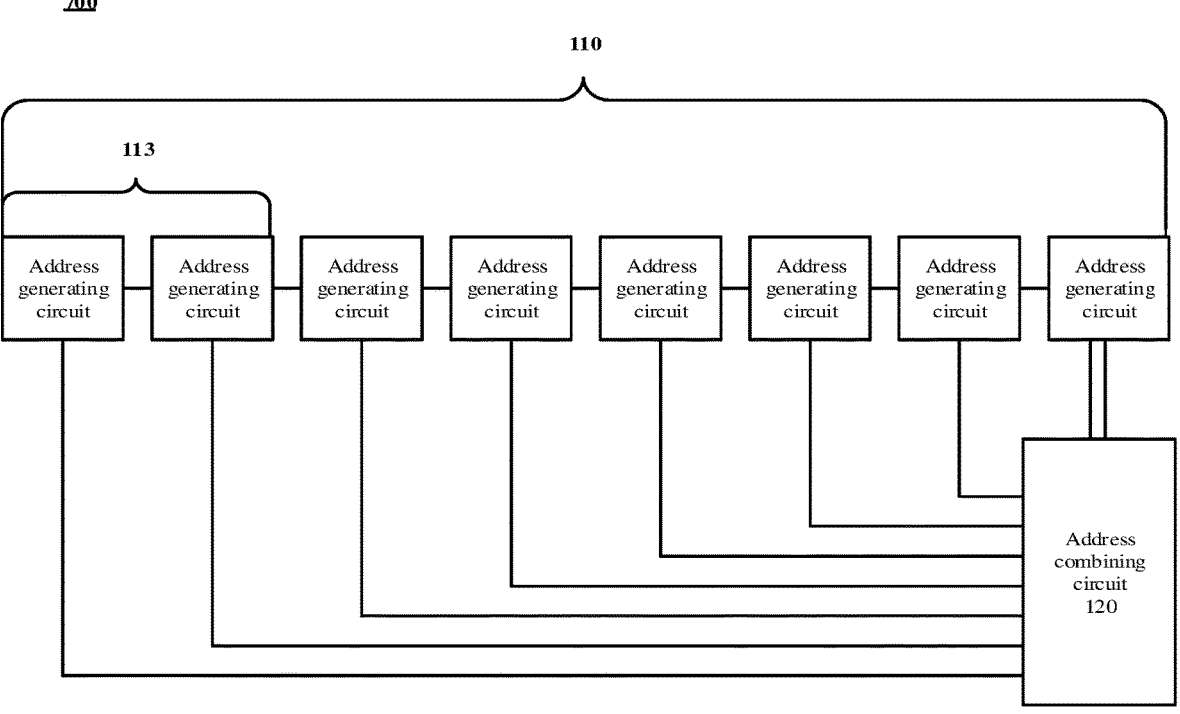
FIG. 7 is a block diagram of the apparatus for address generation according to further embodiments of the present disclosure.

FIG. 7 is a block diagram of the apparatus for address generation according to further embodiments of the present disclosure.

As shown in FIG. 7, the apparatus for address generation 700 includes R address generating circuits 113 (which may also be referred to as R third address generating circuits) and the address combining circuit 120.

The R address generating circuits 113 correspond to R dimensions (which may also be referred to as R third dimensions) on a one-to-one basis. The r-th address generating circuit is configured to generate the address $y_r$ (which may also be referred to as the third address) on the r-th dimension of each element in the matrix to be stored according to the function $y_r=floor(a_r x_r+b_r)\times T_r$, where $1\leq r\leq R$. Here, elements at different positions on the r-th dimension correspond to different values of $x_r$, and values of $a_r$, $b_r$, and $T_r$ are such that the different values of $x_r$ correspond to different values of $y_r$. It will be appreciated that the elements in the matrix to be stored (which may also be referred to as the third matrix) are distributed along the R dimensions.

The address combining circuit 120 is configured to generate the address for storing each element in the matrix by combining the addresses of each element in the matrix on the R dimensions. Here, the addresses for storing different elements in the matrix are different.

It should be understood that with reference to FIG. 7, the apparatus for address generation 700 may include a plurality of address generating circuits 110, and the plurality of address generating circuits 110 may further include other address generating circuits than the R address generating circuits 113, and the present disclosure is not limiting in this regard.

As such, the apparatus for address generation 700 may combine to generate the storage address of each element in the matrix to be stored in the manner of the embodiment of the present disclosure.

In some embodiments, the values of $a_r$, $b_r$, and $T_r$ corresponding to the r-th address generating circuit may be determined according to the type of the computation to be performed on the matrix before the apparatus for address generation 700 generates the storage address of each element in the matrix to be stored. Then, the control register may be configured according to the values of $a_r$, $b_r$ and $T_r$ corresponding to the r-th address generating circuit, so that the control register configures the r-th address generating circuit.

FIG. 8 is a flowchart of the method for address generation according to other embodiments of the present disclosure.

As shown in FIG. 8, the method for address generation includes steps 802 and 804.

In step 802, the r-th address generating circuit in the R address generating circuits 113 generates the address $y_r$ of each element in the matrix to be stored on the r-th dimension according to the function $y_r=floor(a_r x_r+b_r)\times T_r$.

In step 804, the address combining circuit 120 generates the address for storing each element in the matrix by combining the addresses of each element in the matrix on the R dimensions.

As such, the storage address of each element in the matrix to be stored may be combined in the manner of embodiments of the present disclosure.

FIG. 9 is a schematic diagram of a data buffer according to some embodiments of the present disclosure.

As shown in FIG. 9, the data buffer 900 includes at least one of a first address generating device 901 and a second address generating device 902 (the first address generating device 901 and the second address generating device 902 are schematically shown in FIG. 9), and a storage circuit 903.

The first apparatus for address generation 901 may be, for example, the apparatus for address generation 100. The second apparatus for address generation 902 may be, for example, the apparatus for address generation 700.

The storage circuit 903 may be configured to send each element in a plurality of first matrices required for computations according to the address for accessing each element in each first matrix, and store each element in the matrix according to an address for storing each element in the matrix to be stored.

In some embodiments, the data buffer 900 includes the first apparatus for address generation 901 and the second apparatus for address generation 902. In this manner, the data buffer 900 may generate storage addresses and access addresses of elements in parallel so that the efficiency of subsequent computations may be further performed.

Embodiments of the present disclosure also provide an artificial intelligence chip including the data buffer, e.g., data buffer 900, according to any of the embodiments described above. By providing a data buffer including a highly versatile apparatus for address generation in the artificial intelligence chip, the versatility of the artificial intelligence chip can be improved.

Embodiments of the present disclosure further provide an accelerator including the artificial intelligence chip according to any of the embodiments described above.

Various embodiments of the present disclosure have been described in detail. To avoid obscuring the concepts of the present disclosure, some details known in the art are not described. From the above description, those skilled in the art will fully understand how to implement the technical solutions disclosed herein.

Various embodiments are described herein with one based on a preceding one, each embodiment focusing on differences from the other embodiments; reference can be made for the same or similar parts with one another of the various embodiments. The embodiments of the method for address generation, the data buffer, the artificial intelligence chip, and the accelerator substantially correspond to the embodiments of the apparatus for address generation, so the description thereof is relatively simplified, and reference can be made to the description of the embodiments of the apparatus for relevant details.

While specific embodiments of the disclosure have been described in detail by way of example, it will be understood by those skilled in the art that the foregoing examples are illustrative only and are not intended to limit the scope of the disclosure. It will be appreciated by those skilled in the art that changes may be made to the above embodiments or some technical features made be replaced with equivalents without departing from the scope and spirit of the disclosure. The scope of the disclosure is defined by the appended claims.

The invention claimed is:

1. An apparatus for address generation, used in a data buffer included in an artificial intelligence (AI) chip, the AI chip including a computation circuit, and the data buffer including a storage circuit, the apparatus comprising:

a plurality of address generating circuits, comprising:

N first address generating circuits corresponding to N first dimensions on a one-to-one basis, wherein an n-th first address generating circuit is configured to generate a first address $y_n$ of each element in each first matrix in a plurality of first matrices required for computations on an n-th first dimension according to a function $y_n=floor(a_n x_n+b_n)\times T_n$, where $1\leq n\leq N$, elements at different positions on the n-th first dimension correspond to different values of $x_n$, values of $a_n$, $b_n$ and $T_n$ are such that the different values of $x_n$ correspond to different values of $y_n$ to ensure a unique address for each element on the n-th first dimension, and the plurality of first matrices are distributed along M second dimensions; and M second address generating circuits different from the N first address generating circuits and corresponding to the M second dimensions on a one-to-one basis, wherein an m-th second address generating circuit is configured to generate a second address $y_m$ of each first matrix on an m-th second dimension according to a function $y_m=floor(a_m x_m+b_m)\times T_n$, where $1\leq m\leq M$, the first matrices at different positions on the m-th second dimension correspond to different values of $x_m$, and values of $a_m$, $b_m$ and $T_m$ are such that the different values of $x_m$ correspond to different values of $y_m$ to ensure a unique address for each element on the m-th second dimension; and an address combining circuit configured to generate an address for accessing each element in each first matrix from the storage circuit by combining the second address of each first matrix on the M second dimensions and the first address of each element in each first matrix on N first dimensions, the address being configured to instruct the storage circuit to sequentially output each element to the computation circuit according to the address, such that the computation circuit accesses the element and performs a corresponding computation.

2. The apparatus for address generation according to claim 1, wherein the n-th first address generating circuit comprises:

a first output circuit configured to output a value of $x_n$ corresponding to each element in each first matrix; and a first arithmetic circuit configured to calculate a first intermediate address $IA_n$ of each element in each first matrix on the n-th first dimension on a basis of a formula $IA_n=floor(a_n)\times T_n\times x_n+floor(b_n)\times T_n$, and for any one element, calculate the first address $y_n$ on a basis of a formula $y_n=IA_n+floor((a_n-floor(a_n))\times x_n)\times T_n$, where $IA_n\neq floor(a_n x_n+b_n)\times T_n$.

3. The apparatus for address generation according to claim 2, wherein the first arithmetic circuit comprises:

a first address adder configured to calculate the first intermediate address $IA_n$ of each element on a basis of the formula $IA_n=floor(a_n)\times T_n\times x_n+floor(b_n)\times T_n$;

a first adder configured to calculate an offset value $OV_n$ of each element in each first matrix on the n-th first dimension on a basis of a formula $OV_n=floor((a_n-floor(a_n))\times x_n)$;

a comparator configured to determine, for any one element, whether an absolute value of the offset value $|OV_n|$ is greater than or equal to 1, send a first indication signal in a case of $|OV_n|{\geq}1$, and send a second indication signal in a case of $|OV_n|{<}1$; and a second address adder configured to calculate the first address $y_n$ of the any one element on a basis of the formula $y_n=IA_n+floor((a_n-floor(a_n))\times x_n)\times T_n$ in response to the first indication signal, and take the first intermediate address $IA_n$ of the any one element is as the first address $y_n$ in response to the second indication signal.

4. The apparatus for address generation according to claim 2, wherein $x_n$ corresponding to each element in each first matrix is an integer greater than or equal to 0, and a difference between the values of $x_n$ corresponding to any two adjacent elements on the n-th first dimension is consistent.

5. The apparatus for address generation according to claim 4, wherein the difference between the values of $x_n$ corresponding to any two adjacent elements on the n-th first dimension is 1.

6. The apparatus for address generation according to claim 4, wherein the first output circuit comprises a counter.

7. The apparatus for address generation according to claim 1, wherein the m-th second address generating circuit comprises:

a second output circuit configured to output $x_m$ corresponding to each first matrix;

a second arithmetic circuit configured to calculate a second intermediate address $IA_m$ of each first matrix on the m-th second dimension on a basis of a formula $IA_m=floor(a_m)\times T_m\times x_m+floor(b_m)\times T_m$, and for any one first matrix, calculate the second address $y_m$ on a basis of a formula $y_m=IA_m+floor((a_m-floor(a_m))\times x_m)\times T_m$, where $IA_m{\neq}floor(a_m x_m+b_m)\times T_m$.

8. The apparatus for address generation according to claim 1, wherein each first matrix comprises elements at P positions distributed along the n-th first dimension, where $P{\geq}2$, an element at an i-th position is adjacent to an element at an (i+1)-th position in the elements at the P positions, and $1{\leq}i{\leq}P-1$;

the plurality of first matrices comprise first matrices at Q positions distributed along the m-th second dimension, where $Q{\geq}2$, a first matrix at a j-th position is adjacent a first matrix at a (j+1)-th position in the first matrices at the Q positions, and $1{\leq}j{\leq}Q-1$;

wherein the n-th first address generating circuit is configured to sequentially generate the first address $y_n$ of each element in each first matrix in an order from a 1st position to a P-th position, and the m-th second address generating circuit is configured to sequentially generate the second address $y_m$ of each first matrix in an order from a 1st position to a Q-th position.

9. The apparatus for address generation according to claim 8, wherein a (k−1)-th second address generating circuit is configured to generate the second address of the first matrix at each position on a (k−1) second dimension when a k-th second address generating circuit generates the second address of the first matrix at any position on a k-th second dimension, where $2{\leq}k{\leq}M$;

an N-th first address generating circuit is configured to generate the first address of the element at each position on the N-th first dimension when a 1st second address generating circuit generates the second address of the first matrix at any position on a 1st second dimension; and an (s−1)-th first address generating circuit is configured to generate the first address of the element at each position on an (s−1)-th first dimension when an s-th first address generating circuit generates the first address of the element at any position on an s-th first dimension, where $2{\leq}s{\leq}N$.

10. The apparatus for address generation according to claim 1, wherein the elements at same positions on the n-th first dimension in each first matrix belong to the elements at same positions on the n-th first dimension in a second matrix; the second matrix comprises a third matrix, and at least some of the elements in each first matrix belong to the third matrix, wherein the elements in the third matrix are distributed along R third dimensions, and the R third dimensions comprise the N first dimensions and the M second dimensions;

the plurality of address generating circuits comprise:

R third address generating circuits corresponding to the R third dimensions on a one-to-one basis, wherein an r-th third address generating circuit is configured to generate a third address $y_r$ of each element on an r-th third dimension in the third matrix according to a function $y_r=floor(a_r x_r+b_r)\times T_r$, where $1{\leq}r{\leq}R$, the elements at different positions on the r-th third dimension correspond to different values of $x_r$, and values of $a_r$, $b_r$ and $T_r$ are such that the different values of $x_r$ correspond to different values of $y_r$;

wherein the address combining circuit is further configured to generate addresses for storing each element in the third matrix by combining the third addresses of each element in the third matrix on the R third dimensions, where the addresses for storing different elements in the third matrix are different.

11. The apparatus for address generation according to claim 10, wherein the N first dimensions and the M second dimensions comprise a same at least one dimension;

the address combining circuit comprises:

at least one second adder corresponding to the at least one dimension on a one-to-one basis, wherein each second adder is configured to add the first address of each element in each first matrix on a corresponding dimension to the second address of the first matrix on the corresponding dimension to obtain a fourth address of each element on the corresponding dimension; and an address combining sub-circuit is configured to:

as to any one of the at least one dimension, determine whether the fourth address of each element on the any one dimension belongs to a set of addresses for the any one dimension, so as to obtain a determination result for the any one dimension, wherein the set of addresses for the any one dimension is composed of the third address of each element in the third matrix on the any one dimension; and as to any one element, in a case of a negative determination result for a certain dimension in the at least one dimension, adjust the fourth address on the certain dimension to be the third address in the set of addresses for the certain dimension; after the adjustment, add up the fourth address on the at least one dimension, the first address on the first dimensions other than the at least one dimension in the N first dimensions, and the second address on the second dimensions other than the at least one dimension in the M second dimensions, so as to obtain the address for accessing the any one element.

12. The apparatus for address generation according to claim 1, combined with a storage circuit to form a data buffer, the storage circuit configured to send each element in the plurality of first matrices according to the address for accessing each element in each first matrix, and store each element in the matrix according to the address for storing each element in the matrix.

13. A method for address generation, used in a data buffer included in an artificial intelligence (AI) chip, the AI chip including a computation circuit, and the data buffer including a storage circuit, the method comprising:

generating a first address $y_n$ of each element in each first matrix in the plurality of first matrices required for computations on an n-th first dimension according to a function $y_n = floor(a_n x_n + b_n) \times T_n$ by an n-th first address generating circuit in N first address generating circuits, the N first address generating circuits corresponding to N first dimensions on a one-to-one basis, where $1 \leq n \leq N$, elements at different positions on the n-th first dimension correspond to different values of $x_n$, values of $a_n$, $b_n$ and $T_n$ are such that the different values of $x_n$ correspond to different values of $y_n$ to ensure a unique address for each element on the n-th first dimension, and the plurality of first matrices are distributed along M second dimensions;

generating a second address $y_m$ of each first matrix on an m-th second dimension according to a function $y_m = floor(a_m x_m + b_m) \times T_m$ by an m-th second address generating circuit in M second address generating circuits, the M second address generating circuits being different from the N first address generating circuits and corresponding to M second dimensions on a one-to-one basis, where $1 \leq m \leq M$, the first matrices at different positions on the m-th second dimension correspond to different values of $x_m$, and values of $a_m$, $b_m$ and $T_m$ are such that the different values of $x_m$ correspond to different values of $y_m$ to ensure a unique address for each element on the m-th second dimension; and generating an address for accessing each element in each first matrix from the storage circuit by an address combining circuit that combines the second address of each first matrix on the M second dimensions and the first address of each element in each first matrix on N first dimensions, the address being configured to instruct the storage circuit to sequentially output each element to the computation circuit according to the address, such that the computation circuit accesses the element and performs a corresponding computation.

* * * * *